United States Patent
Shono et al.

[11] Patent Number: 6,161,845
[45] Date of Patent: Dec. 19, 2000

[54] VEHICLE HEIGHT ADJUST CONTROL APPARATUS AND METHOD

[75] Inventors: Shoichi Shono, Nishikamo-gun; Atushi Sato, Susono, both of Japan

[73] Assignee: Toyota Jidosha Kabushiki Kaisha, Toyota, Japan

[21] Appl. No.: 09/166,193

[22] Filed: Oct. 5, 1998

[30] Foreign Application Priority Data

Oct. 13, 1997 [JP] Japan .................................. 9-279187

[51] Int. Cl.⁷ .................................................. B60G 17/01
[52] U.S. Cl. .................. 280/6.15; 280/6.157; 280/5.514
[58] Field of Search ................................ 280/5.5, 5.514, 280/6.15, 6.157; 701/37

[56] References Cited

U.S. PATENT DOCUMENTS

| | | | |
|---|---|---|---|
| 4,647,069 | 3/1987 | Iijima | 280/707 |
| 4,659,104 | 4/1987 | Tanaka et al. | 280/707 |
| 4,693,493 | 9/1987 | Ikemoto et al. | 280/707 |
| 4,809,176 | 2/1989 | Oowa et al. | 364/424 |
| 4,821,191 | 4/1989 | Ikemoto et al. | 364/424.1 |
| 4,924,393 | 5/1990 | Kurosawa et al. | 364/424.05 |
| 5,053,965 | 10/1991 | Fujimura et al. | 364/424.05 |
| 5,069,475 | 12/1991 | Yonekawa et al. | 280/707 |
| 5,080,391 | 1/1992 | Kawabata | 280/707 |
| 5,220,505 | 6/1993 | Yokote et al. | 364/424.05 |

FOREIGN PATENT DOCUMENTS

| | | |
|---|---|---|
| 36 44 942 C2 | 5/1989 | Germany . |
| 60-92913 | 5/1985 | Japan . |
| 2-81785 | 3/1990 | Japan . |
| 5-77621 | 3/1993 | Japan . |

*Primary Examiner*—Brian L. Johnson
*Assistant Examiner*—Daniel Yeagley
*Attorney, Agent, or Firm*—Oliff & Berridge, PLC

[57] ABSTRACT

A vehicle height adjust control apparatus includes a plurality of actuators provided between a vehicle body and a plurality of wheels that are capable of changing a vehicle height at a wheel position corresponding to each of a plurality of wheels of the vehicle, a vehicle height detector that detects an actual vehicle height at different positions, a controller for controlling the actuators to eliminate deviations of each of the actual vehicle heights detected by the vehicle height detector from corresponding predetermined target vehicle heights and a simultaneous controller linked with the controller that simultaneously changes the actual vehicle height at individual wheel positions by controlling the actuators if the actual vehicle heights detected by the vehicle height detector are deviated from the corresponding target vehicle heights by at least a predetermined value toward the same side.

19 Claims, 9 Drawing Sheets

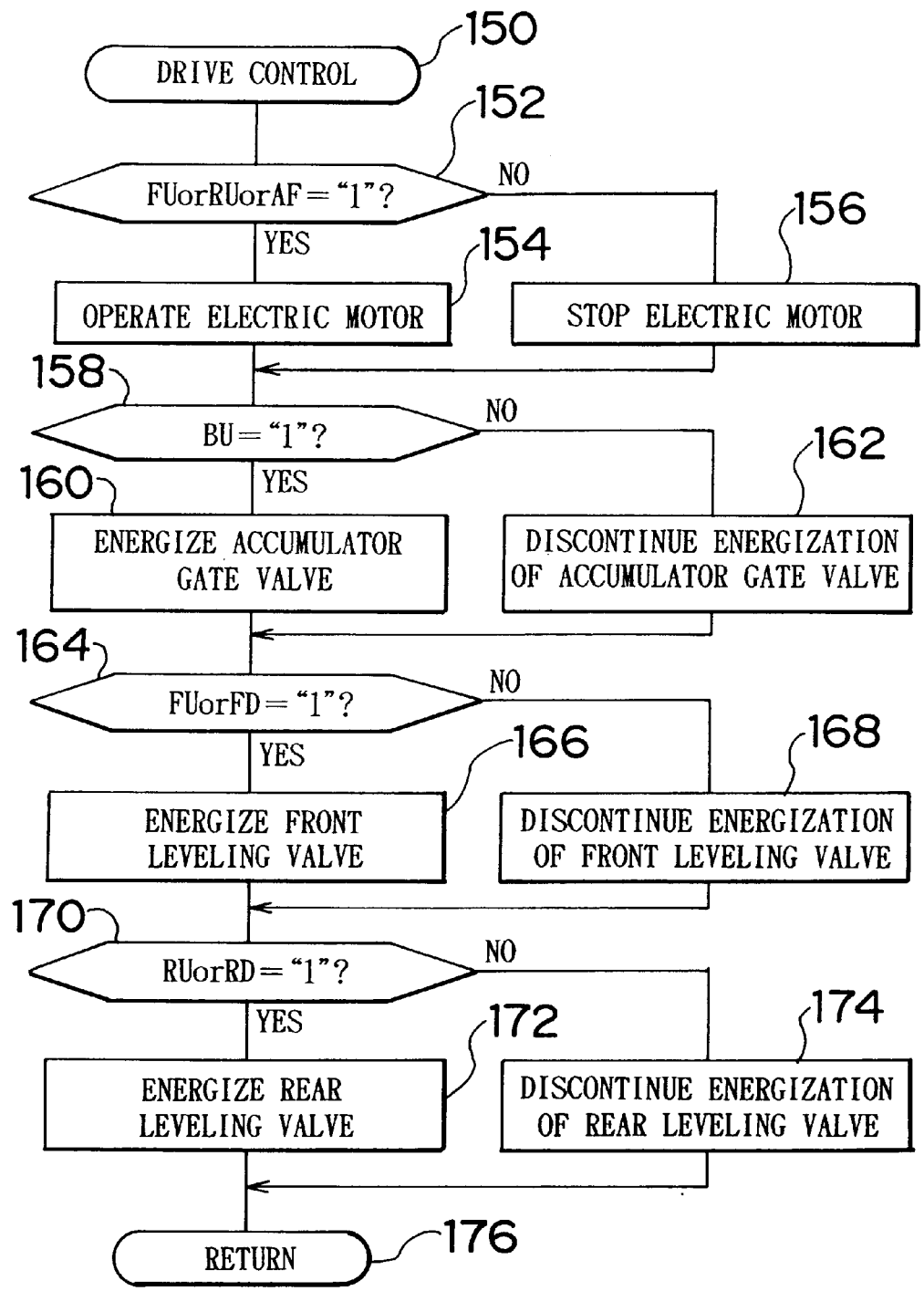

VEHICLE HEIGHT ADJUST CONTROL APPARATUS AND METHOD

INCORPORATION BY REFERENCE

The disclosure of Japanese Patent Application No. HEI 9-279187 filed on Oct. 13, 1997 including the specification, drawings and abstract is incorporated herein by reference in its entirety.

BACKGROUND OF THE INVENTION

1. Field of Invention

The present invention relates to a vehicle height adjust control apparatus and Method for setting vehicle heights at wheel positions to a target vehicle height by supplying hydraulic fluid to and discharging it from hydraulic actuators provided between a vehicle body and wheels.

2. Description of Related Art

A vehicle height adjust control apparatus, as described in Japanese Patent Application Laid-Open No. SHO 60-92913, detects actual vehicle heights at wheel positions, and adjusts the vehicle heights at the wheel positions in decreasing order of deviation from target vehicle heights by controlling the supplying of fluid to and the discharging thereof from actuators corresponding to the wheel positions in the same order.

However, the apparatus described above has the following drawback. If there is a large vehicle height deviation, the difference among the vehicle heights at the wheel positions becomes great during vehicle height adjustment so that the inclination of the vehicle body becomes large and, furthermore, changes in inclination give an uneasy feeling to an occupant.

SUMMARY OF THE INVENTION

Accordingly, it is an object of the present invention to provide a vehicle height adjust control apparatus capable of adjusting a vehicle height without giving an uneasy feeling to an occupant, by adjusting or changing the vehicle heights at wheel positions as uniformly as possible even if there is a large vehicle height deviation.

According to one aspect of the invention, there is provided a vehicle height adjust control apparatus including a plurality of actuators provided between a vehicle body and a plurality of wheels, the actuators being capable of changing a vehicle height at each of the wheel positions corresponding to the individual wheels, a vehicle height detection device for detecting an actual vehicle height at each of the different positions, a control device for controlling the actuators to eliminate a deviation of each of the actual vehicle heights detected by the vehicle height detection device from a corresponding predetermined target vehicle height, and a simultaneous control device associated with the control device for simultaneously changing the vehicle heights at the individual wheel positions by controlling the actuators if the actual vehicle heights detected deviate from the corresponding target vehicle heights by at least a predetermined value toward the same side.

In this vehicle height adjust control apparatus, when there arises a need to raise or lower simultaneously all the portions of the vehicle body due to a considerable change in the superimposed load or a change of the target vehicle height, the simultaneous control device operates to simultaneously control the plurality of actuators to simultaneously raise or lower the vehicle heights at the individual wheel positions. Therefore, the vehicle heights at the individual wheel positions are changed substantially uniformly, and the tilt of the vehicle body caused by the vehicle height adjustment can be minimized. Consequently, the invention is able to adjust the vehicle height without giving an occupant an uneasy feeling caused by a tilt of the vehicle body.

The vehicle height adjust control apparatus may further include a determination device, associated with the control device, for determining whether the vehicle body is tilted at least a predetermined amount, on the basis of the actual vehicle heights detected by the vehicle height detection device, and a stop device provided in the control device, for, when it is determined by the determination device that the vehicle body is tilted at least the predetermined amount, stopping a control operation by the simultaneous control device of simultaneously changing the vehicle heights at the individual wheel positions. With this optional construction, the simultaneous vehicle height changing control is stopped by the stop device in cooperation with the determination device if an excessively large local load is on the vehicle body so that the vehicle body will likely be significantly tilted by the simultaneous vehicle height changing control and the simultaneous control device. Therefore, this construction prevents the vehicle body from tilting to a relatively great extent during the vehicle height adjustment, and reliably avoids giving an occupant an uneasy feeling during the vehicle height adjustment by the simultaneous control device. This construction also prevents a relatively great downward tilt of the rear portion of the vehicle body, thereby preventing an undesired event that the headlights are facing upward during night driving.

The vehicle height adjust control apparatus may further have the following construction. That is, the vehicle height detection device detects at least an actual vehicle height of a front portion of the vehicle body and an actual vehicle height of a rear portion of the vehicle body. A determination device is provided in the control device for determining whether the rear portion of the vehicle body is tilted at least a predetermined amount downward relative to the front portion of the vehicle body, on the basis of the actual vehicle heights detected by the vehicle height detection device. A stop device is provided in the control device for, when it is determined by the determination device that the rear portion of the vehicle body is tilted at least the predetermined amount downward relative to the front portion of the vehicle body, stopping a control operation of simultaneously changing the vehicle heights at the individual wheel positions by simultaneous control device. With this optional construction, the simultaneous vehicle height changing control is stopped by the stop device in cooperation with the determination device if an excessively large local load is on the vehicle body so that the rear portion of the vehicle body will likely be significantly tilted downward by the simultaneous control device. Therefore, this construction prevents a relatively great downward tilt of the rear portion of the vehicle body, thereby preventing an undesired event that the headlights are facing upward during night driving.

According to another aspect of the invention, there is provided a vehicle height adjust control apparatus including a plurality of fluid actuators provided between a vehicle body and a plurality of wheels, respectively, the fluid actuators being capable of changing a vehicle height at each of the wheel positions corresponding to the individual wheels by using fluid supplied and discharged thereto, a pump that ejects the fluid when operated, a fluid supply-discharge device for supplying the fluid ejected by the pump to the fluid actuators and discharging the fluid from the fluid actuators, a vehicle height detection device for detecting an actual vehicle height at each of the different positions, a vehicle height control device for substantially eliminating a deviation of each of the actual vehicle heights detected by the vehicle height detection device from a corresponding predetermined target vehicle height by controlling the pump and the fluid supply-discharge device, an accumulator that accumulates the fluid ejected by the pump, and a simultaneous raising device associated with the vehicle height control device for, only if the actual vehicle heights detected by the vehicle height detection device are at least a predetermined value lower than the corresponding target vehicle heights, simultaneously increasing the vehicle heights at the individual wheel positions by controlling the pump and the fluid supply-discharge device so that an amount of the fluid ejected by the pump and an amount of the fluid in the accumulator are simultaneously supplied to the actuators.

In this vehicle height adjust control apparatus, when all the portions of the vehicle body are to be simultaneously raised, an amount of the fluid accumulated in the accumulator is supplied simultaneously to the plurality of fluid actuators, along with the amount of the fluid ejected by the pump. Therefore, each fluid actuator will produce a sufficient force to raise the entire vehicle body so that the vehicle body can be quickly adjusted to a target vehicle height. Since all portions of the vehicle body will be substantially uniformly changed by this apparatus, the tilt of the vehicle body during the vehicle height adjustment can be minimized. Therefore, it is possible to adjust the vehicle height without giving an occupant an uneasy feeling caused by a tilt of the vehicle body.

The vehicle height adjust control apparatus may further include a determination device, associated with the vehicle height control device, for determining whether the vehicle body is tilted at least a predetermined amount on the basis of the actual vehicle heights detected by the vehicle height detection device, and a stop device associated with the vehicle height control device for, when it is determined by the determination device that the vehicle body is tilted at least the predetermined amount, stopping a control operation by the simultaneous raising control device for simultaneously increasing the vehicle heights at the individual wheel positions. With this optional construction, a relatively great tilt of the vehicle body during the vehicle height adjustment is prevented by the stop device in cooperation with the determination device, as described above. Therefore, this construction reliably avoids giving an occupant an uneasy feeling during the vehicle height adjustment by the simultaneous control device, and prevents the undesired event that the headlights are facing upward during night driving.

The vehicle height adjust control apparatus may further include a prevention device associated with the vehicle height control device for, when the accumulator is accumulating the fluid ejected by the pump, preventing a control operation by the simultaneous raising control device for simultaneously increasing the vehicle heights at the individual wheel positions. This optional construction prevents an inappropriate tilt of the vehicle body due to an insufficient amount of the fluid supplied to the fluid actuators during the simultaneous raising control of the vehicle body.

The vehicle height adjust control may further include a duration measurement device associated with the vehicle height control device, for measuring a duration of a control operation by the simultaneous raising control device for simultaneously increasing the vehicle heights at the individual wheel positions, and a stop device associated with the vehicle height control device for, when the duration detected by the time measurement device becomes equal to or greater than a predetermined value, stopping the control operation. This optional construction is able to prevent exhaustion of the fluid in the accumulator during the simultaneous raising control and therefore prevents an inappropriate tilt of the vehicle body due to an insufficient amount of the fluid supplied to the fluid actuators.

BRIEF DESCRIPTION OF THE DRAWINGS

The foregoing and further objects, features and advantages of the present invention will become apparent from the following description of a preferred embodiment with reference to the accompanying drawings, wherein like numerals are used to represent like elements and wherein:

FIG. 9 is a flowchart illustrating a drive control program executed by the microcomputer shown in FIG. 1.

DETAILED DESCRIPTION OF PREFERRED EMBODIMENTS

Figure 1:
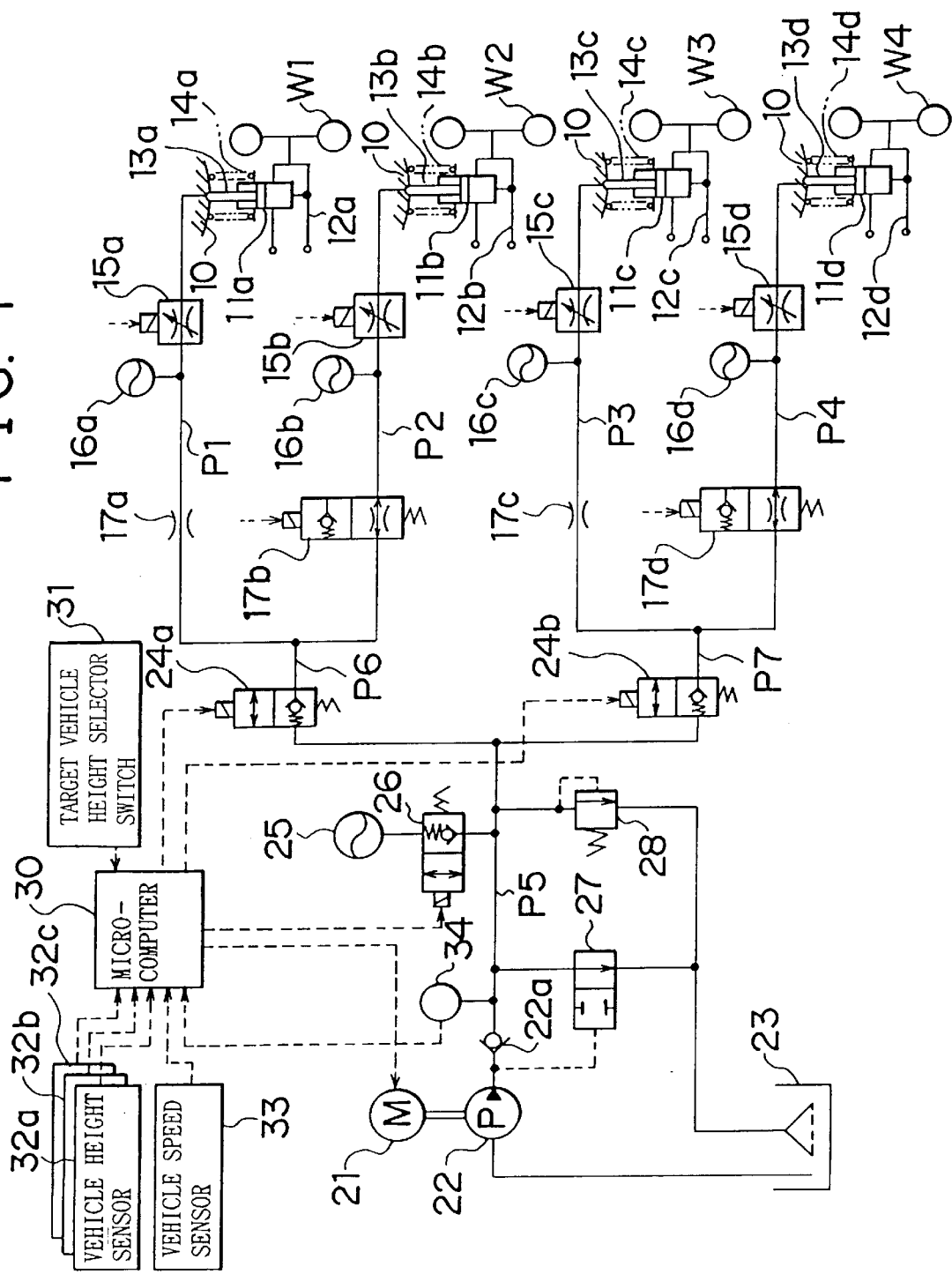
FIG. 1 is a schematic illustration of the overall construction of a vehicle height adjust control apparatus according to the preferred embodiment of the invention.

A preferred embodiment of the present invention will be described in detail hereinafter with reference to the accompanying drawings. FIG. 1 is a schematic illustration of the overall construction of a vehicle height adjust control apparatus according to the preferred embodiment of the invention.

The vehicle height adjust control apparatus has hydraulic cylinders 11a–11d that form hydraulic actuators for setting vehicle heights, near left and right front wheels W1, W2 and left and right rear wheels W3, W4, respectively. Each of the hydraulic cylinders 11a–11d is connected at its lower end to a lower arm 12a–12d connecting to the corresponding one of the wheels W1–W4. A piston rod 13a–13d of each hydraulic cylinder 11a–11d protrudes from an upper surface thereof. Upper end portions of the piston rods 13a–13d are fixed to a vehicle body 10. Hydraulic fluid is supplied to and discharged from the hydraulic cylinders 11a–11d through fluid passages P1–P4, respectively. In accordance with supply and discharge of hydraulic fluid, the hydraulic cylinders 11a–11d change the vehicle height at the respective wheel positions.

Coil springs 14a–14d are disposed between the vehicle body 10 and the hydraulic cylinders 11a–11d, respectively. The fluid passages P1–P4 are provided with variable orifices 15a–15d, respectively. Accumulators 16a–16d are connected to the fluid passages P1–P4, respectively. In cooperation with the coil springs 14a–14d, the variable orifices 15a–15d and the accumulators 16a–16d, the hydraulic cylinders 11a–11d elastically support the vehicle body 10 relative to the wheels W1–W4, and also function as shock absorbers for damping oscillations of the vehicle body 10. The variable orifices 15a–15d are electrically controlled so as to vary their orifice openings. The control of the orifice openings of the variable orifices 15a–15d is not directly related to the invention, and will not be described.

The fluid passages P1, P2 and the fluid passages P3, P4 are connected, at their ends opposite from the hydraulic cylinders 11a, 11b and 11c, 11d, to common fluid passages, respectively. Therefore, hydraulic fluid is collectively supplied to and discharged from the hydraulic cylinders 11a, 11b through the fluid passages P1, P2, and hydraulic fluid is collectively supplied to and discharged from the hydraulic cylinders 11c, 11d through the fluid passages P3, P4. The fluid passages P2, P4 are provided with gate valves 17b, 17d formed by electromagnetic changeover valves, respectively. The gate valves 17b, 17d are in a conveying state as indicated in FIG. 1 when not energized, and they are switched to a non-conveying state when energized. The gate valves 17b, 17d are energized when the vehicle body 10 rolls, for example, at the time of cornering or turning, so as to prevent communication between the hydraulic cylinders 11a and 11b and communication between the hydraulic cylinders 11c and 11d, respectively. The operation of the gate valves 17b, 17d is not directly relevant to the invention, and the description below will be made on assumption that the gate valves 17b, 17d are always in the conveying state as indicated in FIG. 1. The fluid passages P1, P3 are provided with invariable orifices 17a, 17c, respectively, for providing the fluid passages P1, P3 with a passage resistance equivalent to that provided by orifice openings that are formed by the gate valves 17b, 17d when in the conveying state.

A hydraulic pressure supply-discharge device has a hydraulic pump 22 that is driven by an electric motor 21. The hydraulic pump 22 draws hydraulic fluid from a reservoir tank 23, and ejects it into a fluid passage P5 through a check valve 22a. The fluid passage P5 divides into fluid passages P6, P7. The branch fluid passage P6 is connected to the connecting point of the fluid passages P1, P2. The branch fluid passage P7 is connected to the connecting point of the fluid passages P3, P4. The fluid passages P6, P7 are provided with leveling valves 24a, 24b that are formed by electromagnetic changeover valves. The leveling valves 24a, 24b remain in a non-conveying state as indicated in FIG. 1 when not energized, and they are switched to a conveying state when energized. If the hydraulic pressure in the fluid passages P1–P4 becomes abnormally high, the leveling valves 24a, 24b allow discharge of hydraulic fluid from the fluid passages P1–P4 into the fluid passage P5 for protection of the apparatus even while they are in the non-conveying state.

An accumulator 25 for accumulating high-pressure hydraulic fluid is connected to the fluid passage P5, via an accumulator gate valve 26. The hydraulic fluid accumulated in the accumulator 25 is used to increase the vehicle height. The accumulator gate valve 26 is formed by an electromagnetic changeover valve made up of a plunger, a coil and the like. The accumulator gate valve 26, when not energized, remains in a state indicated in FIG. 1, where the accumulator gate valve 26 allows hydraulic fluid to flow from the fluid passage P5 into the accumulator 25 only when the hydraulic pressure in the fluid passage P5 is a predetermined amount higher than the hydraulic pressure in the accumulator 25. When energized, the accumulator gate valve 26 is switched from the state indicated in FIG. 1 to a conveying state.

A discharge valve 27 and a relief valve 28 are disposed between the fluid passage P5 and the reservoir tank 23. The discharge valve 27 is normally kept in a conveying state, and mechanically switched to a non-conveying state when the ejecting pressure of the hydraulic pump 22 increases. The passage area of the discharge valve 27 when the discharge valve 27 is kept in the conveying state is at least twice as large as the passage area of the leveling valves 24a, 24b when they are in the open state. The relief valve 28 is normally kept in a non-conveying state. Only when the hydraulic pressure in the fluid passage P5 becomes very high, the relief valve 28 is switched to a conveying state to let hydraulic fluid out of the fluid passage P5 into the reservoir tank 23 for protection of the apparatus.

A target vehicle height selector switch 31 is a switch that is operated by an occupant to select vehicle heights. Vehicle height sensors 32a, 32b are disposed between the vehicle body 10 and the lower arms 12a, 12b at the left and right front wheels W1, W2, respectively. Each of the vehicle height sensors 32a, 32b detects the height of the vehicle body 10 at the left or right front wheel W1, W2 relative to a road surface (or an under-spring member), and outputs a detection signal indicating the actual vehicle height Hf1, Hf2. A vehicle height sensor 32c is disposed at a transversely middle position in a rear portion of the vehicle body 10, between the vehicle body 10 and a frame (corresponding to an under-spring member not shown) connecting the lower arms 12c and 12d. The vehicle height sensor 32c detects the height of the vehicle body 10 at the transversely middle position in the rear portion of the vehicle, relative to the road surface (or the under-spring member), and outputs a detection signal indicating the actual vehicle height Hr. A vehicle speed sensor 33 detects a vehicle speed and outputs a detection signal indicating the vehicle speed V. A pressure sensor 34 detects a fluid pressure P in the fluid passage P5 and outputs a detection signal indicating the fluid pressure P.

The operation of the embodiment constructed as described above will be described. First, the overall operation will be briefly described. When the ignition switch (not shown) is turned on, a microcomputer 30 executes a program (not illustrated) to initially set "0" in various flags used in programs described below, and then starts to execute a vehicle height detecting control program illustrated in FIG. 2 and a drive control program illustrated in FIG. 9 repeatedly every predetermined short period.

After starting the execution of the vehicle height detecting control program in step 100, the microcomputer 30 receives inputs of detection signals from the vehicle height sensors 32a–32c, the vehicle speed sensor 33 and the pressure sensor 34 indicating the actual vehicle heights Hf1, Hf2, Hr, the vehicle speed V and the pressure P in step 102. If the actual vehicle heights Hf1, Hf2, Hr, the vehicle speed V and the pressure P from the sensors 32a–32c, 33, 34 have instantaneous changes and therefore are not suitable for direct use in the operations by the microcomputer 30, the signals of the actual vehicle heights Hf1, Hf2, Hr, the vehicle speed V and the pressure P are subjected to low-pass filter processing.

Subsequently in step 104, the microcomputer 30 calculates an actual vehicle height $$Hf(=(Hf1+Hf2)/2)$$

of a front portion of the vehicle body 10 by averaging the actual vehicle heights Hf1, Hf2. In step 106, the microcomputer 30 calculates vehicle height deviations $$\Delta Hf(=Hf^*-Hf), \Delta Hr(=Hr^*-Hr)$$

by subtracting the actual vehicle heights Hf, Hr of the front and rear portions of the vehicle body 10 from the target vehicle heights Hf*, Hr* of the front and rear portions of the vehicle body 10. The target vehicle heights Hf*, Hr* are set by execution of a program (not shown) in response to a selecting operation performed with the target vehicle height selector switch 31. In a vehicle wherein the vehicle height changing by the target vehicle height selector switch 31 is not possible, the target vehicle heights Hf*, Hr* are fixed to predetermined values.

After step 106, it is determined in step 108 whether the accumulator flag AF is "1". The accumulator flag AF indicates by "1" that an operation is being performed to accumulate high-pressure fluid in the accumulator 25. The accumulator flag AF is initially set to "0". Therefore, the microcomputer 30 makes a negative determination in step 108, and proceeds to step 114. In step 114, it is determined whether a control flag CF is "0". The control flag CF indicates by "1" that hydraulic fluid is being supplied to or discharged from the hydraulic cylinders 11a–11d to change the vehicle height of the front or rear portion of the vehicle body 10. Because the control flag CF is initially set to "0", the microcomputer 30 makes an affirmative determination in step 114, and proceeds to step 116.

In step 116, it is determined whether a vehicle height changing start instruction has been outputted. The vehicle height changing start instruction is outputted by a program (not illustrated), when at least one of the target vehicle heights Hf*, Hr* is changed in response to an operation of the target vehicle height selector switch 31, or when it is determined that at least one of the actual vehicle heights Hf, Hr has deviated a predetermined value or greater from the corresponding target vehicle height Hf*, Hr* at least predetermined number of times within a predetermined length of time, or when it is determined that at least one of the actual vehicle heights Hf, Hr has been deviated a predetermined value or greater from the corresponding target vehicle height Hf*, Hr* for at least a predetermined length of time. If the vehicle height changing start instruction has not been outputted, the microcomputer 30 makes a negative determination in step 116, and temporarily ends the execution of the vehicle height detecting control program in step 140.

Conversely, if the vehicle height changing start instruction is outputted, the microcomputer 30 makes an affirmative determination in step 116, and sets the control flag CF to "1" in step 118, and proceeds to a simultaneous raising determining routine of step 120. In the simultaneous raising determining routine, it is determined whether to simultaneously raise the front and rear portions of the vehicle body 10, on the basis of predetermined conditions described below. If it is determined that the front and rear portions should be simultaneously raised, the microcomputer 30 sets a simultaneous raising flag BU, a front raising flag FU and a rear raising flag RU to "1". Subsequently in step 140, the execution of the vehicle height detecting control program is temporarily ended. Conversely, if it is determined that the front and rear portions of the vehicle body 10 should not be simultaneously raised, the microcomputer 30 maintains the flags BU, FU, RU at "0", and proceeds to a simultaneous lowering determining routine of step 122.

In the simultaneous lowering determining routine of step 122, it is determined whether to simultaneously lower the front and rear portions of the vehicle body 10, on the basis of conditions described below. If it is determined that the front and rear portions of the vehicle body 10 should be simultaneously lowered, the microcomputer 30 sets a simultaneous lowering flag BD, a front lowering flag FD and a rear lowering flag RD to "1". Subsequently in step 140, the execution of the vehicle height detecting control program is temporarily ended. Conversely, if it is determined that the front and rear portions of the vehicle body 10 should not be simultaneously lowered, the microcomputer 30 maintains the flags BD, FD, RD at "0", and proceeds to step 124.

In step 124, it is determined which one of the front portion and the rear portion of the vehicle body 10 should be raised or lowered, on the basis of the vehicle height deviations $\Delta Hf$, $\Delta Hr$, in accordance with predetermined conditions. For example, in a case where one of the absolute values $|\Delta Hf|$, $|\Delta Hr|$ of the vehicle height deviations $\Delta Hf$, $\Delta Hr$, is equal to or less than a predetermined small value $\Delta Ho$ (>0), it is determined that the portion of the vehicle body 10 corresponding to the other absolute value is to be raised or lowered. In a case where both absolute values $|\Delta Hf|$, $|\Delta Hr|$ are greater than the predetermined small value $\Delta Ho$, it is determined that the portion of the vehicle body 10 corresponding to the greater absolute value is to be raised or lowered. In a case where the vehicle height deviations $\Delta Hf$, $\Delta Hr$ are positive (that is, downward from the target vehicle heights Hf*, Hr*) and greater than the predetermined small value $\Delta Ho$, it is determined that the portion of the vehicle body 10 corresponding to the greater vehicle height deviation is to be raised prior to the other. If it is determined that the front portion of the vehicle body 10 is to be raised or lowered, the microcomputer 30 sets the front raising flag FU or the front lowering flag FD to "1", and ends the execution of the vehicle height detecting control program in step 140. If it is determined that the rear portion of the vehicle body 10 is to be raised or lowered, the microcomputer 30 sets the rear raising flag RU or the rear lowering flag RD to "1", and ends the execution of the vehicle height detecting control program in step 140. In the processing of step 124, only one of the flags FU, FD, RU, RD is set to "1" at a time.

In this manner, the control flag CF is set to "1", and at least one of the flags BU, BD, FU, FD, RU, RD is set to "1". Therefore, the next time the vehicle height detecting control program is executed, the microcomputer 30 makes a negative determination in step 114, and then proceeds to step 126.

In step 126, it is determined whether the simultaneous raising flag BU is "1". If the simultaneous raising flag BU has been set to "1", the microcomputer 30 makes an affirmative determination in step 126, and then executes a simultaneous raising end determining routine of step 128. If the simultaneous lowering flag BD has been set to "1", the microcomputer 30 makes a negative determination in step 126, and makes an affirmative determination in step 130, and then executes simultaneous lowering end determining routine of step 132. In each of these routines, it is determined whether the simultaneous raising or lowering of the front and rear portions of the vehicle body 10 is to be ended, on the basis of predetermined conditions described below. When it is determined that the simultaneous raising or lower is to be ended, the simultaneous raising flag BU or the simultaneous lowering flag BD is set back to "1". In addition, the raising or lowering flags FU, RU, FD, RD are simultaneously set back to "0", in accordance with the condition of the ending.

If both the simultaneous raising flag BU and the simultaneous lowering flag BD are "0" and one of the front raising flag FU and the front lowering flag FD has been set to "1", the microcomputer 30 makes an affirmative determination in step 134, and executes a front control end determining routine of step 136. If one of the rear raising flag RU and the rear lowering flag RD has been set to "1" (which means that both the front raising flag FU and the front lowering flag FD are "0"), the microcomputer 30 makes a negative determination in step 134, and executes a rear control end determining routine of step 138. In each of these routines, it is determined whether the raising or lowering of the front or rear portion of the vehicle body 10 is to be ended, on the basis of predetermined conditions described below. When it is determined that the raising or lowering of the front or rear portion is to be ended, the flag concerned is set back to "0".

Besides the execution of the vehicle height detecting control program, the microcomputer 30 executes a drive control program illustrated in FIG. 9. After the execution of the drive control program is started in step 150, the microcomputer 30 controls the electric motor 21, the leveling valves 24a, 24b and the accumulator gate valve 26 in accordance with the statuses of the various flags AF, BU, BD, FU, FD, RU, RD, in steps 152 through 176. Next described will be the raising and lowering control of the vehicle body 10. The simultaneous raising control operation, the simultaneous lowering control operation, the front raising control operation, the front lowering control operation, the rear raising control operation and the rear lowering control operation will be described separately in detail.

a. Simultaneous Raising Control

Figure 2:
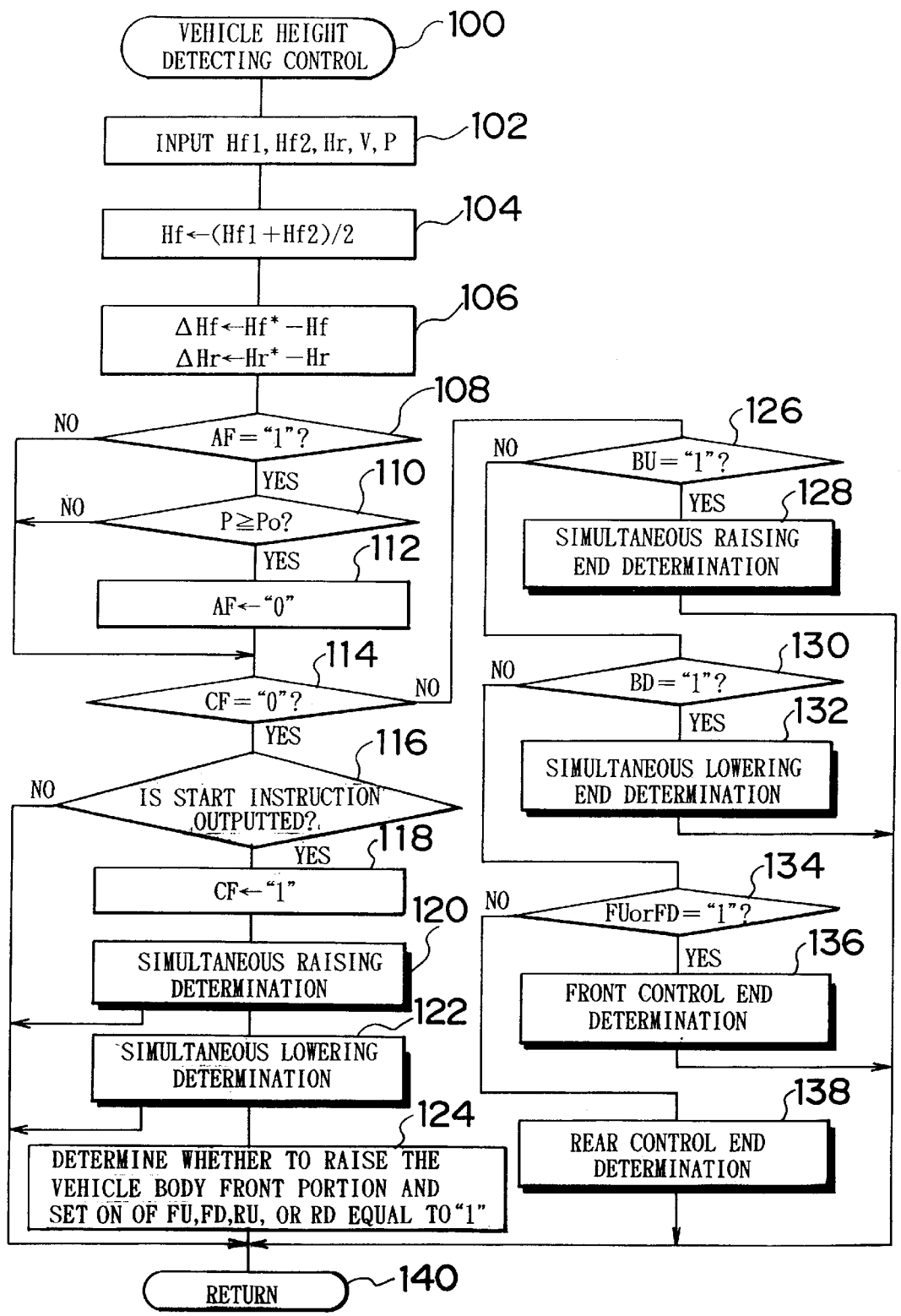
FIG. 2 is a flowchart illustrating a vehicle height detecting control program executed by the microcomputer shown in FIG. 1.
Figure 3:
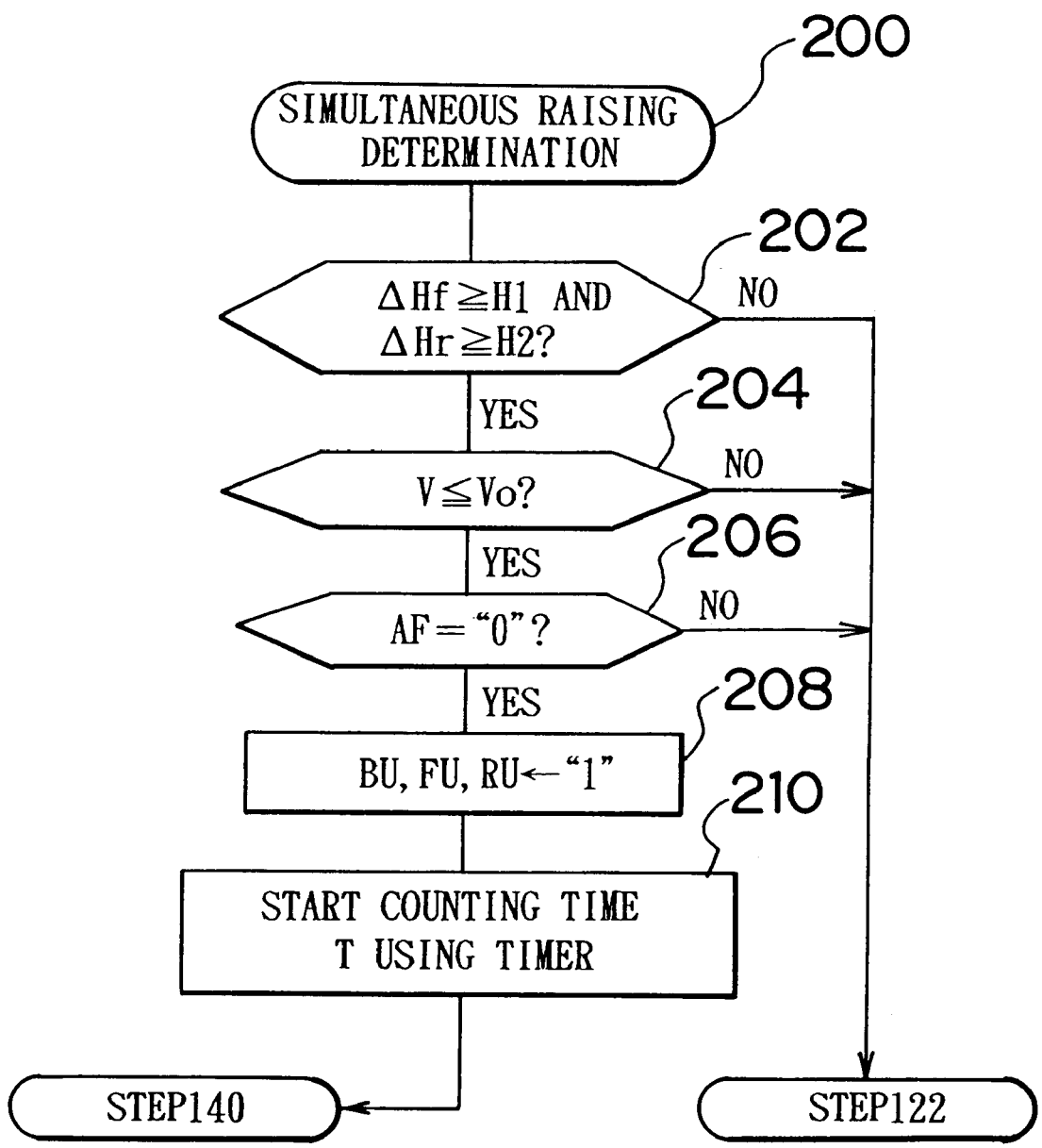
FIG. 3 is a flowchart illustrating in detail the simultaneous raising determining routine indicated in FIG. 2.

The simultaneous raising determining routine of step 120 in FIG. 2 is illustrated in detail in FIG. 3. After the routine is started in step 200, the microcomputer 30 determines whether to simultaneously raise the front and rear portions of the vehicle body 10 in the process of steps 202 through 206.

In step 202, it is determined whether the vehicle height deviation ΔHf is equal to or greater than a predetermined value H1 and the vehicle height deviation ΔHr is equal to or greater than a predetermined value H2. If not, the simultaneous raising is not performed. In other words, it is determined in step 202 whether a condition is met for the simultaneous raising of the front and rear portions of the vehicle body 10 and, at the same time, it is determined whether the amounts to be raised are great to some extent. This determining step serves to limit the incidence of the simultaneous raising of the front and rear portions of the vehicle body 10, thereby reducing the incidence of operation of the electric motor 21 and the hydraulic pump 22. That is, since the simultaneous raising of the front and rear portions of the vehicle body 10 consumes high-pressure hydraulic fluid accumulated in the accumulator 25, the electric motor 21 and the hydraulic pump 22 must be operated after the consumption, in order to accumulate high-pressure hydraulic fluid in the accumulator 25. Apparently, during operation, the electric motor 21 and the hydraulic pump 22 bear great loads. Therefore, by reducing the incidence of operation of the electric motor 21 and the hydraulic pump 22, the aforementioned determining step (step 202) increases the service life of the electric motor 21 and the hydraulic pump 22. In step 204, it is determined whether the vehicle speed V is equal to or less than a predetermined vehicle speed Vo (for example, 25 km/h). If not, the simultaneous raising is not performed. If the front and rear portions of the vehicle body 10 were simultaneously raised despite a considerably high vehicle speed V, the driving performance of the vehicle could be adversely affected by a rapid or sharp displacement of the vehicle body 10. In step 206, it is determined whether the accumulator flag AF is "0". If not, the simultaneous raising is not performed. The accumulator flag AF indicates by "1" that an operation is being performed to accumulate high-pressure fluid ejected by the hydraulic pump 22 in the accumulator 25, as mentioned above. During the accumulating operation, it is impossible to use high-pressure fluid accumulated in the accumulator 25 in order to raise the vehicle body 10.

If all the determination conditions of steps 202–206 are met, the microcomputer 30 makes affirmative determination in each of steps 202–206, and sets the simultaneous raising flag BU, the front raising flag FU and the rear raising flag RU to "1" in step 208. Subsequently in step 210, a built-in timer of the microcomputer 30 is caused to start counting time T. The program operation then proceeds to step 140 in FIG. 2. Conversely, if any one of the determination conditions of steps 202–206 is not met, the microcomputer 30 makes a negative determination in that step, and proceeds to step 122 in FIG. 2.

If the simultaneous raising flag BU, the front raising flag FU and the rear raising flag RU have been set to "1" as described above, the microcomputer 30 makes an affirmative determination in steps 152, 158, 164, 170 in the drive control program of FIG. 9, and executes the processings of steps 154, 160, 166, 172. Therefore, the operation of the electric motor 21 is started, and the accumulator gate valve 26 and the leveling valves 24a, 24b are energized so as to switch from the states indicated in FIG. 1 to the other states.

When the electric motor 21 is started, hydraulic fluid is ejected by the hydraulic pump 22. By the ejection pressure, the discharge valve 27 is switched from the state indicated in FIG. 1 to the other state. Therefore, an amount of hydraulic fluid ejected by the hydraulic pump 22 and an amount of high-pressure hydraulic fluid let out of the accumulator 25 through the accumulator gate valve 26 flow into the fluid passage P5, so that hydraulic fluid flows simultaneously into the hydraulic cylinders 11a–11d through the leveling valves 24a, 24b, the fluid passages P6, P7 and the fluid passages P1–P4. Due to the inflows of hydraulic fluid, the hydraulic cylinders 11a–11d, provided near the left and right front wheels W1, W2 and the left and right rear wheels W3, W4, raises the vehicle body 10 at the respective wheel positions, so that the front and rear portions of the vehicle body 10 simultaneously rise. In this operation, the front and rear portions of the vehicle body 10 are quickly raised because a sufficient amount of high-pressure hydraulic fluid has been accumulated in the accumulator 25.

Since the simultaneous raising flag BU remains at "1" during the simultaneous raising control, the simultaneous raising end determining routine of step 128 is executed as described above the next time the vehicle height detecting control program of FIG. 2 is executed. The simultaneous raising end determining routine is illustrated in detail in FIG. 5. After the routine is started in step 300, the microcomputer 30 determines whether various simultaneous raising end determination conditions are met in steps 302–310.

In step 302, it is determined whether the actual vehicle height Hf of the front portion of the vehicle body 10 has become at least a predetermined value H5 greater than the actual vehicle height Hr of the rear portion of the vehicle body 10. If so, the simultaneous raising flag BU is set to "0" in step 324. This determination condition prevents the rear portion of the vehicle body 10 from significantly tilting downward relative to the front portion thereof due to, for example, an excessively great local load on the vehicle body 10, and therefore prevents a significant upward shift of the headlight beams and avoids giving an occupant an uneasy feeling. In step 304, it is determined whether the vehicle speed V has become greater than the predetermined vehicle speed Vo. If so, the simultaneous raising flag BU is set to "0" in step 324. This determination condition substantially eliminates the possibility of an adverse effect on the driving performance of the vehicle caused by the simultaneous raising of the front and rear portions of the vehicle body 10 during a relatively high-speed cruise of the vehicle, as described above. In step 306, it is determined whether the time T the counting of which has been started in step 210 in FIG. 3 has reached a predetermined value To. If so, the simultaneous raising flag BU is set to "0" in step 324. This determination condition is provided because the amount of high-pressure fluid accumulated in the accumulator 25 is limited and because the capacities of the electric motor 21 and the hydraulic pump 22 are not sufficiently large to continue the simultaneous raising after the accumulated hydraulic fluid has been consumed. If the simultaneous raising were continued after the amount of hydraulic fluid in the accumulator 25 has been consumed, very large loads would be imposed on the electric motor 21 and the hydraulic pump 22. If none of the determination conditions of steps 302–306 is met, the microcomputer 30 makes a negative determination in each step, and proceeds to step 308.

In step 308, the microcomputer 30 determines whether at least one of the absolute values |ΔHf|, |ΔHr| of the vehicle height deviations ΔHf, ΔHr has become equal to or less than the predetermined small value ΔHo, that is, whether at least one of the vehicle heights Hf, Hr has become substantially equal to the corresponding target vehicle height Hf* or Hr*. If this condition is not met, the microcomputer 30 makes a negative determination in step 308, and ends the execution of the simultaneous raising end determining routine in step 334. In this case, the simultaneous raising control of the front and rear portions of the vehicle body 10 is continued.

When at least one of the vehicle heights Hf, Hr has become substantially equal to the corresponding target vehicle height Hf* or Hr*, the microcomputer 30 makes an affirmative determination in step 308, and proceeds to step 310. In step 310, it is determined whether both absolute values |ΔHf|, |ΔHr| of the vehicle height deviations ΔHf, ΔHr have become equal to or less than the predetermined small value ΔHo, that is, whether both vehicle heights Hf, Hr have become substantially equal to the respective target vehicle heights Hf*, Hr*. If this condition is met, the microcomputer 30 makes an affirmative determination in step 310, and then sets the simultaneous raising flag BU, the front raising flag FU and the rear raising flag RU back to "0" in step 312, and sets the control flag CF back to "0" in step 314, and sets the accumulator flag AF to "1" in step 332, and ends the execution of the simultaneous raising end determining routine in step 334.

The next time the drive control program of FIG. 9 is executed while the simultaneous raising flag BU, the front raising flag FU and the rear raising flag RU have been set back to "0" as described above, the microcomputer 30 makes a negative determination in steps 158, 164, 170, and executes the processings of steps 162, 168, 174. Therefore, the energization of the accumulator gate valve 26 and the leveling valves 24a, 24b is discontinued, so that these valves return to the state indicated in FIG. 1. As a result, the amounts of hydraulic fluid in the hydraulic cylinders 11a–11d are maintained so as to keep the actual vehicle heights Hf, Hr of the front and rear portions of the vehicle body 10 substantially at the target vehicle heights Hf*, Hr*. Since the accumulator flag AF has been set to "1", the microcomputer 30 repeatedly makes an affirmative determination in step 152 and, therefore, the electric motor 21 continues to operate. As a result, hydraulic fluid ejected by the hydraulic pump 22 starts to flow into the accumulator 25 through the accumulator gate valve 26, so that high-pressure hydraulic fluid will accumulate in the accumulator 25.

The next time the vehicle height detecting control program of FIG. 2 is executed with the flag statuses mentioned above, the microcomputer 30 makes an affirmative determination in step 108, that is, determines that the accumulator flag AF is "1", and then determines in step 110 whether the fluid pressure P in the fluid passage P5 detected by the pressure sensor 34 has become equal to or greater than a predetermined fluid pressure P0. Since the fluid pressure in the fluid passage P5 does not considerably increase until the accumulation of high-pressure fluid in the accumulator 25 is completed, the microcomputer 30 repeatedly makes a negative determination in step 110. When the accumulation of high-pressure fluid is completed, the fluid pressure in the fluid passage P5 increases. Therefore, the microcomputer 30 makes an affirmative determination in step 110, and sets the accumulator flag AF back to "0" in step 112. As a result, the determination in step 152 in the drive control program of FIG. 9 becomes negative, so that the operation of the electric motor 21 is stopped by the processing of step 156.

Next described will be an operation performed in a case where the actual vehicle heights Hf, Hr of the front and rear portions of the vehicle body 10 do not simultaneously become substantially equal to the respective target vehicle heights Hf*, Hr*. In this case, when at least one of the actual vehicle heights Hf, Hr becomes substantially equal to the corresponding target vehicle height Hf* or Hr*, the microcomputer 30 makes an affirmative determination in step 308 as described above, but makes a negative determination in step 310. Therefore, the program operation proceeds to step 316. In step 316, the microcomputer 30 sets the simultaneous raising flag BU back to "0". Subsequently in step 318, it is determined whether the absolute value |ΔHf| of the vehicle height deviation ΔHf is equal to or less than the predetermined small value ΔHo, that is, it is determined which one of the actual vehicle heights Hf, Hr of the front and rear portions of the vehicle body 10 has become substantially equal to the corresponding target vehicle height Hf* or Hr*.

If it is the vehicle height Hf of the front portion that has become substantially equal to the target vehicle height Hf*, the microcomputer 30 makes an affirmative determination in step 318, and sets the front raising flag FU back to "0" in step 320. Therefore, by the processings of steps 158, 162, 164, 168 in the drive control program of FIG. 9, the accumulator gate valve 26 and the leveling valve 24a for the front portion of the vehicle body 10 are switched back to the states indicated in FIG. 1. As a result, the fluid pressure in the hydraulic cylinders 11a, 11b is maintained, so that the vehicle height Hf of the front portion is maintained substantially at the target vehicle height Hf*. In this case, since the electric motor 21 continues operating and the leveling valve 24b for the rear portion of the vehicle body 10 is maintained in the state opposite to the state indicated in FIG. 1, hydraulic fluid continues flowing from the hydraulic pump 22 into the hydraulic cylinders 11c, 11d, thereby further raising the rear portion of the vehicle body 10. The raise of the rear portion is stopped by a rear raising control described below. The fluid ejecting pressure of the hydraulic pump 22 is set to a sufficiently large value to raise either one of the front and rear portions of the vehicle body 10.

Conversely, if prior to the vehicle height Hf of the front portion, the vehicle height Hr of the rear portion of the vehicle body 10 becomes substantially equal to the target vehicle height Hr*, the microcomputer 30 makes a negative determination in step 318, and sets the rear raising flag RU back to "0" in step 322. Therefore, by the processings of steps 158, 162, 170, 174 in the drive control program of FIG. 9, the accumulator gate valve 26 and the leveling valve 24b for the rear portion of the vehicle body 10 are switched back to the states indicated in FIG. 1. As a result, the fluid pressure in the hydraulic cylinders 11c, 11d is maintained, so that the vehicle height Hr of the rear portion is maintained substantially at the target vehicle height Hr*. In this case, since the electric motor 21 continues operating and the leveling valve 24a for the front portion of the vehicle body 10 is maintained in the state opposite to the state indicated in FIG. 1, hydraulic fluid continues flowing from the hydraulic pump 22 into the hydraulic cylinders 11a, 11b, thereby further raising the front portion of the vehicle body 10. The raise of the front portion is stopped by a front raising control described below.

Next described will be an operation performed in a case where any one of the end determination conditions of steps 302–306 described above is met In this case, the microcomputer 30 makes an affirmative determination in the corresponding one of steps 302, 304, 306, and proceeds to step 324. The microcomputer 30 sets the simultaneous raising flag BU back to "0" in step 324, and compares the magnitudes of the absolute values |ΔHf|, |ΔHr| of the vehicle height deviations ΔHf, ΔHr of the front and rear portions of the vehicle body 10 in step 326. If the absolute value |ΔHf| regarding the front portion is greater than the absolute value |ΔHr| regarding the rear portion, the microcomputer 30 makes an affirmative determination in step 326, and then sets the rear raising flag RU back to "0" in step 328. If the absolute value |ΔHf| regarding the front portion is equal to or less than the absolute value |ΔHr| regarding the rear portion, the microcomputer 30 makes a negative determination in step 326, and then sets the front raising flag FU back to "0" in step 330. Therefore, by the drive control program of FIG. 9, the simultaneous raising control of the front and rear portions of the vehicle body 10 using the hydraulic pump 22 and the accumulator 25 is stopped; that is, the raising control of the front or rear portion of the vehicle body 10 corresponding to the smaller absolute value of the vehicle height deviation is stopped while the raising control of the other portion of the vehicle body 10, corresponding to the greater absolute value of the vehicle height deviation, is continued. The continued raise of the front or rear portion of the vehicle body 10 is stopped by the front raising control or the rear raising control described below. After the raising control of the portion of the vehicle body 10 corresponding to the greater absolute value of the vehicle height deviation is completed, the portion corresponding to the smaller absolute value starts to be raised by the front raising control or the rear raising control.

The accumulator flag AF is set to "1" in step 332 either after the process of steps 316–322 or after the process of steps 324–330. Therefore, by the process of steps 108–112 in FIG. 2, high-pressure hydraulic fluid is accumulated in the accumulator 25 by the electric motor 21 and the hydraulic pump 22.

b. Simultaneous Lowering Control

Figure 4:
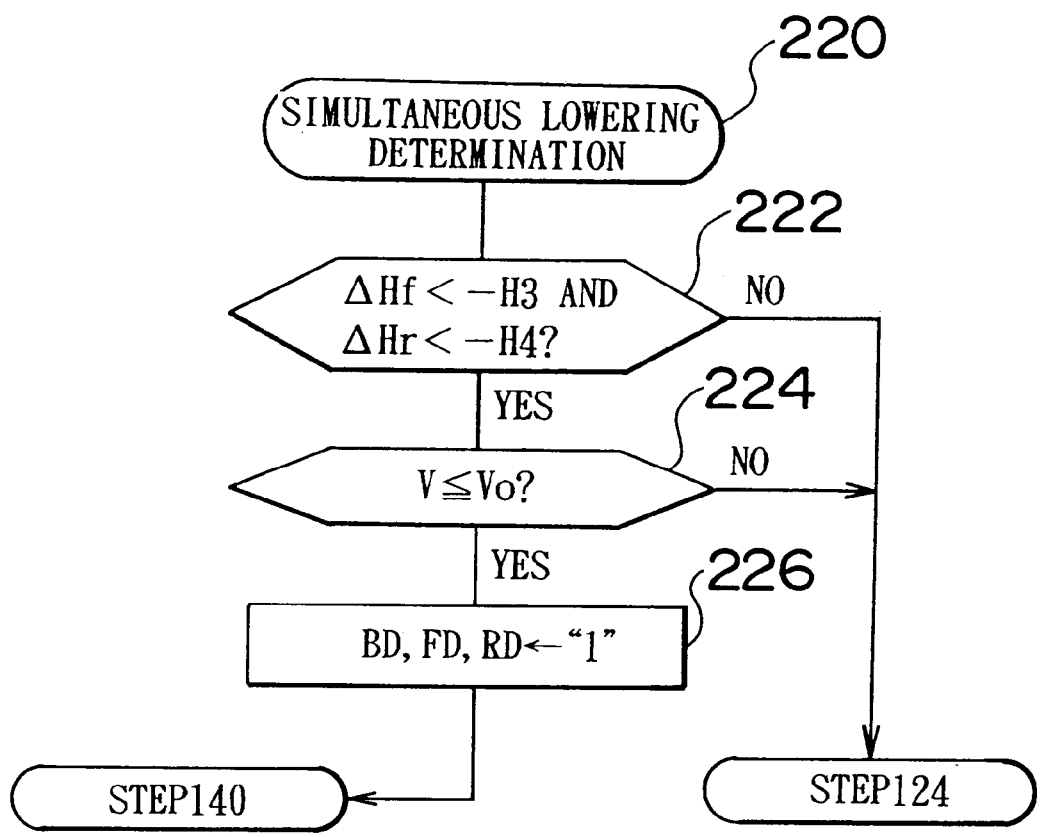
FIG. 4 is a flowchart illustrating in detail the simultaneous lowering determining routine indicated in FIG. 2.

The simultaneous lowering determining routine of step 122 in FIG. 2 is illustrated in detail in FIG. 4. After the routine is started in step 220, the microcomputer 30 determines whether to simultaneously lower the front and rear portions of the vehicle body 10 in the process of steps 222, 224.

In step 222, it is determined whether the vehicle height deviation ΔHf is less than a predetermined negative value −H3 and the vehicle height deviation ΔHr is less than a predetermined negative value −H4. If not, the simultaneous lowering is not performed. In other words, it is determined in step 222 whether a condition is met for the simultaneous lowering of the front and rear portions of the vehicle body 10. The absolute values |H3|, |H4| of the predetermined values −H3, −H4 are smaller than the predetermined values H1, H2 used in the simultaneous raising control, because of the following reasons. The lowering of the vehicle body 10 is achieved merely by letting hydraulic fluid to flow out of the hydraulic cylinders 11a–11d. Therefore, for the lowering of the vehicle body 10, the accumulator 25 is not used, and the problem of large loads on the electric motor 21 and the hydraulic pump 22 related to the supplying of hydraulic fluid into the accumulator 25 does not arise. In step 224, it is determined whether the vehicle speed V is equal to or less than the predetermined vehicle speed Vo (for example, 25 km/h). If not, the simultaneous lowering is not performed. If the front and rear portions of the vehicle body 10 were simultaneously lowered despite a considerably high vehicle speed V, the driving performance of the vehicle could be adversely affected by a rapid or sharp displacement of the vehicle body 10.

If both determination conditions of steps 222, 224 are met, the microcomputer 30 makes an affirmative determination in steps 222, 224, and sets the simultaneous lowering flag BD, the front lowering flag FD and the rear lowering flag RD to "1" in step 226. The program operation then proceeds to step 140 in FIG. 2. Conversely, if not both determination conditions of steps 222, 226 are met, the microcomputer 30 makes a negative determination in the corresponding step, and proceeds to step 124 in FIG. 2.

If the simultaneous lowering flag BD, the front lowering flag FD and the rear lowering flag RD have been set to "1" as described above, the microcomputer 30 makes an affirmative determination in steps 164,170 in the drive control program of FIG. 9, and executes the processings of steps 166, 172. Therefore, the leveling valves 24a, 24b are energized so as to switch from the state indicated in FIG. 1 to the other states. In this case, the electric motor 21 has been stopped by the process of steps 152, 156, that is, the hydraulic pump 22 does not eject hydraulic fluid. In addition, the discharge valve 27 is maintained in the conveying state indicated in FIG. 1. Therefore, hydraulic fluid is discharged from the hydraulic cylinders 11a–11d into the reservoir tank 23 through the fluid passages P1–P4, P6, P7, the leveling valves 24a, 24b, the fluid passage P5 and the discharge valve 27, so that the front and rear portions of the vehicle body 10 simultaneously lower. Since the fluid passage area of the discharge valve 27 is sufficiently larger than that of the leveling valves 24a, 24b, the discharge of hydraulic fluid is quickly performed, thereby quickly lowering the front and rear portions of the vehicle body 10.

Since the simultaneous lowering flag BD remains at "1" during the simultaneous lowering control of the front and rear portions of the vehicle body 10, the simultaneous lowering end determining routine of step 132 is executed as described above, the next time the vehicle height detecting control program of FIG. 2 is executed. The simultaneous lowering end determining routine is illustrated in detail in FIG. 6. After the routine is started in step 350, the microcomputer 30 determines whether simultaneous lowering end determination conditions are met in steps 352,354. The determination conditions of steps 352, 354 are the same as the determination conditions of steps 302, 304 in the simultaneous raising end determining routine. That is, the simultaneous lowering control is continued on conditions that the actual vehicle height Hf of the front portion of the vehicle body 10 it not greater by at least the predetermined value H5 than the actual vehicle height Hr of the rear portion of the vehicle body 10 and that the vehicle speed V is equal to or less than predetermined vehicle speed Vo. Therefore, as in the simultaneous raising control, this determination process prevents the rear portion of the vehicle body 10 from significantly tilting relative to the front portion thereof due to, for example, an excessively great local load on the vehicle body 10, and therefore prevents a significant upward shift of the front light beam and avoids giving an occupant an uneasy feeling, and, furthermore, substantially eliminates the possibility of an adverse effect on the driving performance of the vehicle caused by the simultaneous lowering of the front and rear portions of the vehicle body 10 during a relatively high-speed cruise of the vehicle.

If microcomputer 30 makes a negative determination in steps 352, 354, it is determined in step 356 whether at least one of the vehicle heights Hf, Hr has become substantially equal to the corresponding target vehicle height Hf* or Hr*, as in step 308 in the simultaneous raising end determining routine. If this condition is not met, the microcomputer 30 makes a negative determination in step 356, and ends the execution of the simultaneous lowering end determining routine in step 380. In this case, the simultaneous lowering control of the front and rear portions of the vehicle body 10 is continued.

When at least one of the vehicle heights Hf, Hr has become substantially equal to the corresponding target vehicle height Hf* or Hr*, the microcomputer 30 makes an affirmative determination in step 356, and proceeds to step 358. The processing of step 358 is the same as that of step 310 in the simultaneous raising end determining routine. That is, if both vehicle heights Hf, Hr have become substantially equal to the respective target vehicle heights Hf*, Hr*, the program operation proceeds to steps 360, 362. The microcomputer 30 sets the simultaneous lowering flag BD, the front lowering flag FD and the rear lowering flag RD back to "0" in step 360, and sets the control flag CF back to "0" in step 362, and ends the execution of the simultaneous lowering end determining routine in step 380.

The next time the drive control program of FIG. 9 is executed while the simultaneous lowering flag BD, the front lowering flag FD and the rear lowering flag RD have been set back to "0" as described above, the microcomputer 30 makes negative determinations in steps 164, 170, and executes the processings of steps 168, 174. Therefore, the energization of the leveling valves 24a, 24b is discontinued, so that these valves return to the state indicated in FIG. 1. As a result, the amounts of hydraulic fluid in the hydraulic cylinders 11a–11d are maintained so as to keep the actual vehicle heights Hf, Hr of the front and rear portions of the vehicle body 10 substantially at the target vehicle heights Hf*, Hr*.

If only one of the actual vehicle heights Hf, Hr of the front and rear portions of the vehicle body 10 has become substantially equal to the corresponding target vehicle height Hf* or Hr*, the microcomputer 30 makes an affirmative determination in step 356, but makes a negative determination in step 358. Therefore, the program operation proceeds to step 364. In step 364, the microcomputer 30 sets the simultaneous lowering flag BD back to "0". Subsequently in step 366, it is determined which one of the actual vehicle heights Hf, Hr of the front and rear portions of the vehicle body 10 has become substantially equal to the corresponding target vehicle height Hf* or Hr*, as in step 318 in the simultaneous raising end determining routine. If it is the vehicle height Hf of the front portion that has become substantially equal to the target vehicle height Hf*, the microcomputer 30 makes an affirmative determination in step 366, and sets the front lowering flag FD back to "0" in step 368. Therefore, by the processings of steps 164, 168 in the drive control program of FIG. 9, only the leveling valve 24a for the front portion of the vehicle body 10 is switched back to the state indicated in FIG. 1. As a result, the fluid pressure in the hydraulic cylinders 11a, 11b is maintained, so that the vehicle height Hf of the front portion is maintained substantially at the target vehicle height Hf*. In this case, since the leveling valve 24b for the rear portion of the vehicle body 10 is maintained in the conveying state, hydraulic fluid continues flowing out of the hydraulic cylinders 11c, 11d into the reservoir tank 23, thereby further lowering the rear portion of the vehicle body 10. The lowering of the rear portion is stopped by a rear lowering control described below.

Conversely, if prior to the vehicle height Hf of the front portion, the vehicle height Hr of the rear portion of the vehicle body 10 becomes substantially equal to the target vehicle height Hr*, the microcomputer 30 makes a negative determination in step 366, and sets the rear lowering flag RD back to "0" in step 370. Therefore, by the processings of steps 170, 174 in the drive control program of FIG. 9, the leveling valve 24b for the rear portion of the vehicle body 10 is switched back to the state indicated in FIG. 1. As a result, the fluid pressure in the hydraulic cylinders 11c, 11d is maintained, so that the vehicle height Hr of the rear portion is maintained substantially at the target vehicle height Hr*. In this case, since the leveling valve 24a for the front portion of the vehicle body 10 is maintained in the conveying state, hydraulic fluid continues flowing out of the hydraulic cylinders 11a, 11b into the reservoir tank 23, thereby further lowering the front portion of the vehicle body 10. The lowering of the front portion is stopped by a front lowering control described below.

Next described will be an operation performed in a case where either one of the end determination conditions of steps 352, 354 described above is met. In this case, the microcomputer 30 makes an affirmative determination in the corresponding step 352 or 354, and proceeds to step 372. The microcomputer 30 sets the simultaneous lowering flag BD back to "0" in step 372, and compares the magnitudes of the absolute values |ΔHf|, |ΔHr| of the vehicle height deviations ΔHf, ΔHr of the front and rear portions of the vehicle body 10 in step 374. If the absolute value |ΔHf| regarding the front portion is greater than the absolute value |ΔHf| regarding the rear portion, the microcomputer 30 makes an affirmative determination in step 374, and then sets the rear lowering flag RD back to "0" in step 376. If the absolute value |ΔHf| regarding the front portion is equal to or less than the absolute value |ΔHr| regarding the rear portion, the microcomputer 30 makes a negative determination in step 374, and then sets the front lowering flag FD back to "0" in step 378. Therefore, by the drive control program of FIG. 9, the simultaneous lowering control of the front and rear portions of the vehicle body 10 is stopped; that is, the lowering control of the front or rear portion of the vehicle body 10 corresponding to the smaller absolute value of the vehicle height deviation is stopped while the lowering control of the other portion of the vehicle body 10, corresponding to the greater absolute value of the vehicle height deviation, is continued. The continued lowering of the front or rear portion of the vehicle body 10 is stopped by the front lowering control or the rear lowering control, as in the simultaneous raising end determining routine. After the lowering control of the portion of the vehicle body 10 corresponding to the greater absolute value of the vehicle height deviation is completed, the portion corresponding to the smaller absolute value starts to be lowered by the front lowering control or the rear lowering control described below.

c. Front Raising/Lowering Control

Operations performed in conditions where only the front portion of the vehicle body 10 is to be raised or lowered will be described. Such conditions are set by the processings of steps 124, 128, 132 138.

First, the operation performed in a case where the front portion of the vehicle body 10 is to be raised will be described. In this case, only the control flag CF and the front raising flag FU have been set to "1". Therefore, by the processes of steps 152, 154, 164, 166 in the drive control program of FIG. 9, the electric motor 21 is operated and the leveling valve 24a for the front portion is energized so as to switch from the state indicated in FIG. 1 to the other state. When the electric motor 21 is operated, hydraulic fluid is ejected from the hydraulic pump 22. By the ejecting pressure, the discharge valve 27 is switched from the state indicated in FIG. 1 to the other state. As a result, hydraulic fluid ejected by the hydraulic pump 22 flows into the hydraulic cylinders 11a, 11b through the fluid passage P5, the leveling valve 24a, the fluid passages P6, P1, P2. By the inflows of hydraulic fluid, the hydraulic cylinders 11a, 11b provided near the left and right front wheels W1, W2 raise the vehicle body 10 at the respective wheel positions, so that the entire front portion of the vehicle body 10 is raised. In this case, the amount of hydraulic fluid ejected from the hydraulic pump 22 is sufficient for the supply of hydraulic fluid to the hydraulic cylinders 11a, 11b and, therefore, the hydraulic fluid in the accumulator 25 is not allowed to flow out.

Figure 7:
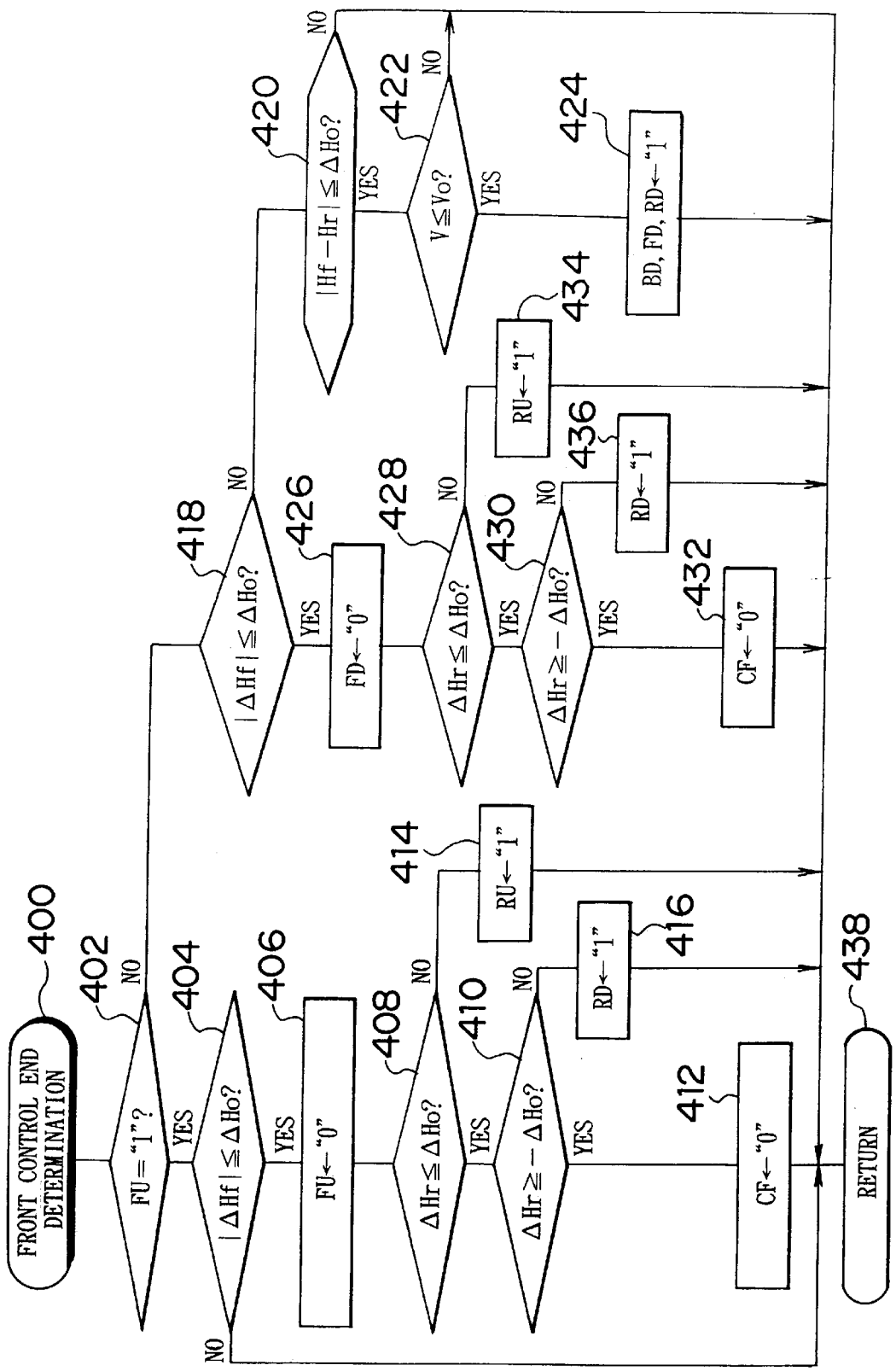
FIG. 7 is a flowchart illustrating in detail the front control end determining routine indicated in FIG. 2.

Since the simultaneous raising flag BU and the simultaneous lowering flag BD remain at "0" and the front raising flag FU has been set to "1", the microcomputer 30 makes affirmative determination in step 134, and executes a front control end determining routine of step 136. The front control end determining routine is illustrated in detail in FIG. 7. After starting the routine in 400, the microcomputer 30 makes an affirmative determination in step 402, and proceeds to step 404. In step 404, it is determined whether the absolute value |ΔHf| of the vehicle height deviation ΔHf of the front portion of the vehicle body 10 has become equal to or less than the predetermined small value ΔHo, that is, whether the vehicle height Hf has become substantially equal to the target vehicle height Hf*. If the vehicle height Hf has not become substantially equal to the target vehicle height Hf*, the microcomputer 30 makes a negative determination in step 404, and temporarily ends the execution of the front control end determining routine. In this case, the front portion of the vehicle body 10 continues rising due to the control described above.

When the vehicle height Hf becomes substantially equal to the target vehicle height Hf*, the microcomputer 30 makes an affirmative determination in step 404, and sets the front raising flag FU back to "0" in step 406. Subsequently, it is determined in step 408 whether the vehicle height deviation ΔHr of the rear portion of the vehicle body 10 is equal to or less than the predetermined small value ΔHo. If so, the microcomputer 30 determines in step 410 whether the vehicle height deviation ΔHr of the rear portion is equal to or greater than the negative predetermined small value –ΔHo. That is, it is determined by the process of steps 408, 410 whether the vehicle height Hr of the rear portion is substantially equal to the target vehicle height Hr*. If the vehicle height deviation ΔHr is equal to or less than the small value ΔHo and equal to or greater than the negative small value –ΔHo, the microcomputer 30 makes an affirmative determination in steps 408, 410, and then sets the control flag CF back to "0" in step 412. Therefore, the next time the drive control program of FIG. 9 is executed, the electric motor 21 is stopped and the leveling valve 24a is switched to the state indicated in FIG. 1 by the processings of steps 152, 156, 164, 168. As a result, the amounts of hydraulic fluid in the hydraulic cylinders 11a, 11b are maintained, so that the vehicle height Hf of the front portion of the vehicle body 10 is maintained substantially at the target vehicle height Hf*.

If the vehicle height deviation ΔHr is greater than the predetermined small value ΔHo, the microcomputer 30 makes a negative determination in step 408, and sets the rear raising flag RU to "1" in step 414. Therefore, by the processings of steps 164, 168 in the drive control program of FIG. 9, the leveling valve 24a is switched back to the state indicated in FIG. 1, so that the amounts of hydraulic fluid in the hydraulic cylinders 11a, 11b are maintained. However, by the processings of steps 152, 154, 170, 172 in the drive control program of FIG. 9, the operation of the electric motor 21 is continued and the leveling valve 24b is switched from the state indicated in FIG. 1 to the other state, so that hydraulic fluid ejected by the hydraulic pump 22 flows into the hydraulic cylinders 11c, 11d through the fluid passage P5, the leveling valve 24b, the fluid passages P7, P3, P4. In this case, therefore, the rear portion of the vehicle body 10 starts to be raised while the vehicle height Hf of the front portion is maintained substantially at the target vehicle height Hf*. The raise of the rear portion of the vehicle body 10 is ended by the rear control end determining routine described below.

If the vehicle height deviation ΔHr is less than the negative small value –ΔHo, the microcomputer 30 makes a negative determination in step 410, and sets the rear lowering flag RD to "1" in step 416. Therefore, by the processings of steps 152, 156, 164, 168 in the drive control program of FIG. 9, the operation of the electric motor 21 is stopped, and the leveling valve 24a is switched back to the state indicated in FIG. 1, so that the amounts of hydraulic fluid in the hydraulic cylinders 11a, 11b are maintained. However, by the processings of steps 170, 172 in the drive control program of FIG. 9, the leveling valve 24b is switched from the state indicated in FIG. 1 to the other state, so that hydraulic fluid is discharged from the hydraulic cylinders 11c, 11d, and flows into the reservoir tank 23 through the fluid passages P3, P4, P7, the leveling valve 24b, the fluid passage P5 and the discharge valve 27. In this case, therefore, the rear portion of the vehicle body 10 starts to be lowered while the vehicle height Hf of the front portion is maintained substantially at the target vehicle height Hf*.

The lowering of the rear portion of the vehicle body 10 is ended by the rear control end determining routine described below.

The operation performed in a case where the front portion of the vehicle body 10 is to be lowered will be described. In this case, only the control flag CF and the front lowering flag FD have been set to "1". Therefore, by the processings of steps 164, 166 in the drive control program of FIG. 9, the leveling valve 24a for the front portion of the vehicle body 10 is energized, so that the valve is switched from the state indicated in FIG. 1 to the other state. As a result, hydraulic fluid is discharged from the hydraulic cylinders 11a, 11b, and flows into the reservoir tank 23 through the fluid passages P1, P2, P6, the leveling valve 24a, the fluid passage P5 and the discharge valve 27, so that the front portion of the vehicle body 10 is lowered.

In this case, the simultaneous raising flag BU and the simultaneous lowering flag BD remain at "0" and the front lowering flag FD has been set to "1". Therefore, the microcomputer 30 makes an affirmative determination in step 134 in the vehicle height detecting control in FIG. 2, and executes the front control end determining routine of step 136. In the front control end determining routine, the microcomputer 30 makes a negative determination in step 402, and proceeds to step 418. In step 418, it is determined whether the vehicle height Hf of the front portion of the vehicle body 10 has become substantially equal to the target vehicle height Hf*, by the processing substantially the same as in step 404. If the vehicle height Hf is not substantially equal to the target vehicle height Hf*, the microcomputer 30 makes a negative determination in step 418, and proceeds to steps 420–424.

In step 420, it is determined whether the absolute value |Hf−Hr| of the difference between the actual vehicle heights Hf, Hr of the front and rear portions of the vehicle body 10 is equal to or less than the small value ΔHo, that is, whether the actual vehicle heights Hf, Hr are substantially equal to each other. If the actual vehicle heights Hf, Hr are not substantially equal to each other, the microcomputer 30 makes a negative determination in step 420, and ends the execution of the front control end determining routine in step 420. Conversely, if the actual vehicle heights Hf, Hr are substantially equal to each other, the microcomputer 30 makes an affirmative determination in step 420, and determines in step 422 whether the vehicle speed V is equal to or less than the predetermined vehicle speed Vo. If the vehicle speed V is equal to or less than the predetermined vehicle speed Vo, the microcomputer 30 proceeds to step 424, where the simultaneous lowering flag BD, the front lowering flag FD and the rear lowering flag RD are set to "1". Therefore, the simultaneous lowering control will be performed. That is, by the process of steps 420–424, the simultaneous lowering control can be resumed from the suspension caused by the processings of steps 352, 354, 372–378 in the simultaneous lowering end determining routine in FIG. 6.

When the vehicle height Hf of the front portion of the vehicle body 10 becomes substantially equal to the target vehicle height Hf*, the microcomputer 30 makes an affirmative determination in step 418, and sets the front lowering flag FD back to "0" in step 426. Therefore, the next time the drive control program of FIG. 9 is executed, the leveling valve 24a for the front portion of the vehicle body 10 is switched from the state indicated in FIG. 1 to the other state by the process of steps 164, 168. As a result, the amounts of hydraulic fluid in the hydraulic cylinders 11a, 11b are maintained, so that the vehicle height Hf is kept substantially equal to the target vehicle height Hf*. Subsequently, the processings of steps 428–436 are executed. The processings of steps 428–436 are the same as those of steps 406–416. By the processings of steps 428–436, the vehicle height control is stopped, or the raising control or the lowering control of the rear portion of the vehicle body 10 is started.

d. Rear Raising/Lowering Control

Operations performed in conditions where only the rear portion of the vehicle body 10 is to be raised or lowered will be described. Such conditions are set by the processings of steps 124, 128, 132, 136 in FIG. 2.

In the case where the rear portion of the vehicle body 10 is to be raised, only the control flag CF and the rear raising flag RU have been set to "1". In the case where the rear portion is to be lowered, only the control flag CF and the rear lowering flag RD have been set to "1". The operations performed in these cases are substantially the same as those performed in the cases where the front portion of the vehicle body 10 is to be raised or lowered, except that the various factors regarding the front portion are replaced by the various factors regarding the rear portion. Therefore, the operations will not be described in detail. Briefly, the rear portion of the vehicle body 10 is raised or lowered by execution of the drive control program of FIG. 9.

Figure 8:
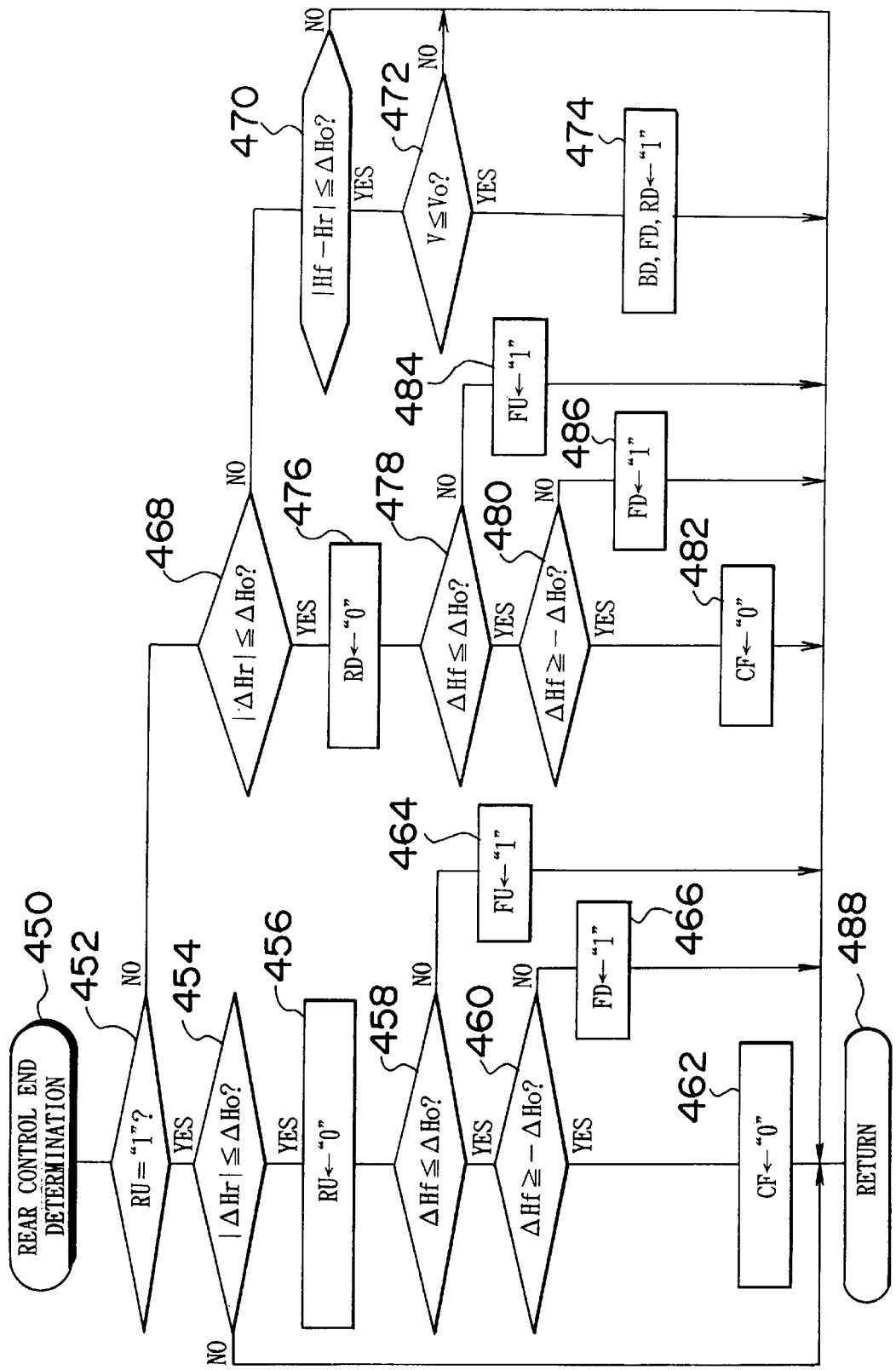
FIG. 8 is a flowchart illustrating in detail the rear control end determining routine indicated in FIG. 2.

In these cases, since the control flag CF has been set to "1" and one of the rear raising flag RU and the rear lowering flag RD has been set to "1", the rear control end determining routine of step 138 in FIG. 2 is executed. The rear control end determining routine has steps 450–488 as illustrated in detail in FIG. 8. The processings of steps 450–488 are substantially the same as the processings of steps 400–438 in the front control end determining routine of FIG. 7, except that the various factors regarding the front portion are replaced by the various factors regarding the rear portion in FIG. 8 and that, instead of the raising and lowering control of the front portion, the raising and lowering control of the rear portion is performed. Although the rear control end determining routine will not be described in detail, execution of the rear control end determining routine ends the raising control and the lowering control of the rear portion of the vehicle body 10. Furthermore, this routine stops the vehicle height control, or starts the raising control or the lowering control of the front portion of the vehicle body 10.

Although in the foregoing embodiment, the two vehicle height sensors are provided in the front portion of the vehicle body 10 and one vehicle height sensor is provided in the rear portion thereof, it is also possible to provide one vehicle height sensor in each of the front and rear portions of the vehicle body 10 and to detect the actual vehicle heights Hf, Hr of the front and rear portions of the vehicle body 10 of the vehicle body 10 using the respective sensors. It is also possible to provide one vehicle height sensor at each of the left and right rear wheels W3, W4, and to detect the vehicle height of the rear portion of the vehicle body 10 by averaging the vehicle heights detected by the two sensors.

Although in the foregoing embodiment, the negative predetermined values −H3, −H4 used in the simultaneous lowering determining routine of FIG. 4 are relatively small in absolute value, it is also possible to set negative values −H3, −H4 that are large in absolute value, as in the predetermined values H1, H2. With such settings, the simultaneous lowering control of the front and rear portions of the vehicle body 10 will be performed only when the actual vehicle heights Hf, Hr of the front and rear portions are great to some extent, in cases where the front and rear portions of the vehicle body 10 are to be lowered.

Figure 5:
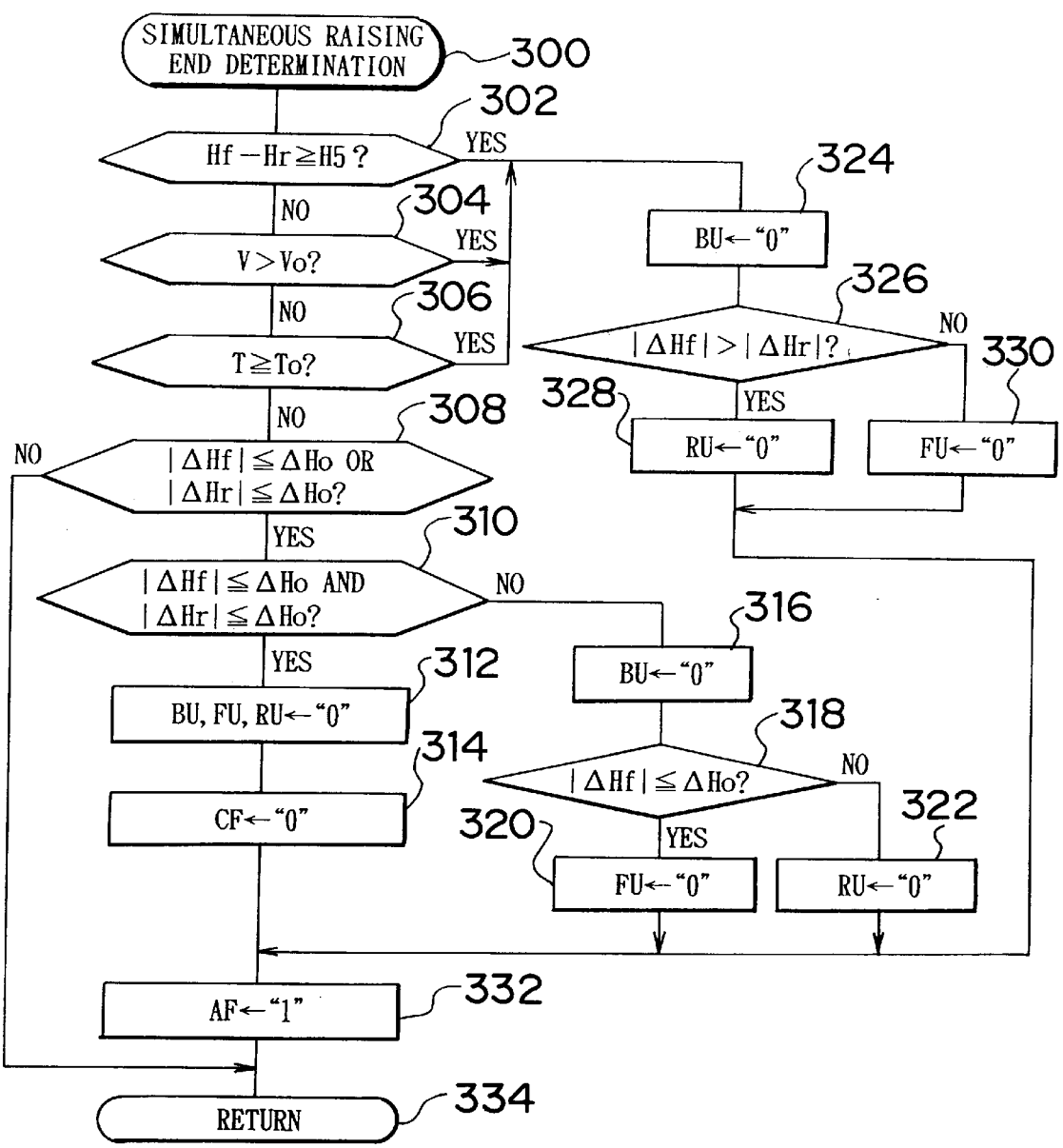
FIG. 5 is a flowchart illustrating in detail the simultaneous raising end determining routine indicated in FIG. 2.
Figure 6:
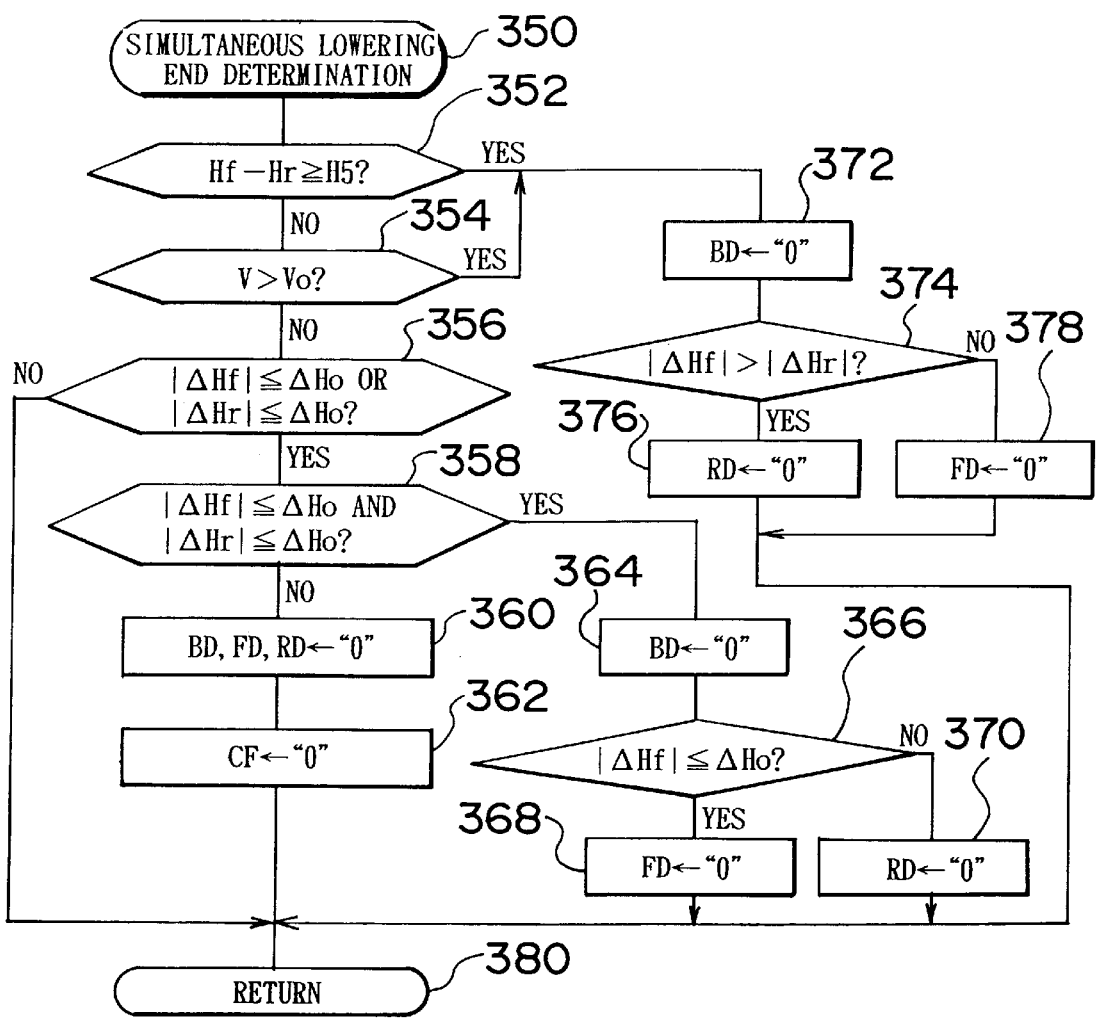
FIG. 6 is a flowchart illustrating in detail the simultaneous lowering end determining routine indicated in FIG. 2.

The foregoing embodiment suspends the simultaneous raising or the simultaneous lowering of the front and rear portions of the vehicle body 10 when the vehicle height Hf of the front portion of the vehicle body 10 becomes at least the predetermined value H5 greater than the vehicle height Hr of the rear portion, through the processing of step 302 in the simultaneous raising end determining routine of FIG. 5 or the processing of step 352 in the simultaneous lowering end determining routine of FIG. 6. However, it is also possible to change the processing of steps 302, 352 to a processing wherein it is determined whether the absolute value |Hf−Hr| of the difference between the actual vehicle heights Hf, Hr of the front and rear portions of the vehicle body 10 has become equal to or greater than the predetermined value H5. In this modification, when the absolute value |Hf−Hr| becomes equal to or greater than the predetermined value H5, the simultaneous raising or lowering control is suspended. This modification takes into consideration a change in the maneuverability of the vehicle due to a rapid or sharp posture change of the vehicle body 10, in a case where the vehicle body 10 is lowered, as well as in a case where the vehicle body 10 is raised.

It is also possible to use the determination condition for suspension of the simultaneous raising and suspension of the simultaneous lowering according to the foregoing embodiment or the aforementioned modification, as a determination condition for start of the simultaneous raising control and start of the simultaneous lowering control. More specifically, the determining processing of steps 302, 352 or the determining processing according to the modification may be inserted between step 202 and step 204 in FIG. 3, and between step 222 and step 224 in FIG. 4. In such a modification, if the vehicle height Hf of the front portion of the vehicle body 10 is at least the predetermined value H5 greater than the vehicle height Hr of the rear portion, or if the absolute value |Hf−Hr| of the difference between the actual vehicle heights Hf, Hr of the front and rear portions of the vehicle body 10 is equal to or greater than the predetermined value H5, the start of the simultaneous raising control and the start of the simultaneous lowering control are prevented.

Although in the foregoing embodiment, the invention is applied to a vehicle height adjust control apparatus for raising and lowering the front and rear portions of the vehicle body 10 simultaneously or independently of each other, the invention may also be applied to a vehicle height adjust control apparatus for raising and lowering the vehicle body 10 separately at each wheel position, or simultaneously at all the wheel positions. It is also possible to apply the invention to a vehicle height adjust control apparatus for raising and lowering the right and left portions of the vehicle body 10 simultaneously or independently of each other. In such applications, the supplying of hydraulic fluid to and the discharging thereof from the hydraulic cylinders provided at the individual wheel positions may be controlled separately for each wheel position or separately for the right wheel positions and the left wheel positions.

Although in the foregoing embodiment, the invention is applied to a hydraulic vehicle height adjust apparatus, the invention may also be applied to vehicle height adjust apparatuses employing other types of fluids, for example, a pneumatic vehicle height adjust apparatus using air. In the application to a pneumatic vehicle height adjust apparatus, the hydraulic pump 22 and the hydraulic cylinder 11a–11d are replaced by a pneumatic pump and pneumatic cylinders, and the accumulator 25 and the various valves 24a, 24b, 26, 27 are also replaced by pneumatic devices.

While the present invention has been described with reference to what is presently considered to be a preferred embodiment thereof, it is to be understood that the invention is not limited to the disclosed embodiment or constructions. To the contrary, the invention is intended to cover various modifications and equivalent arrangements.

What is claimed is:

1. A vehicle height adjust control apparatus comprising:
    a plurality of actuators provided between a vehicle body and a plurality of wheels, respectively, the actuators being capable of changing a vehicle height at a wheel position corresponding to each of a plurality of wheels of the vehicle;
    vehicle height detection means for detecting an actual vehicle height at different positions;
    control means for controlling the actuators to eliminate deviations of each of the actual vehicle heights detected by the vehicle height detection means from corresponding predetermined target vehicle heights; and
    simultaneous control means associated with the control means for simultaneously changing the actual vehicle heights at individual wheel positions by controlling a fluid supply to the actuators from an accumulator if the actual vehicle heights detected by the vehicle height detection means are deviated from the corresponding target vehicle heights by at least a predetermined value toward the same side.

2. A vehicle height adjust control apparatus according to claim 1, further comprising:
    determination means associated with the control means, for determining whether the vehicle body is tilted by at least a predetermined amount, based on the actual vehicle heights detected by the vehicle height detection means; and
    stop means associated with the control means, for, when it is determined by the determination means that the vehicle body is tilted by at least the predetermined amount, stopping a control operation by the simultaneous control means of simultaneously changing the vehicle heights at the individual wheel positions.

3. A vehicle height adjust control apparatus according to claim 1,
    wherein the vehicle height detection means detects at least an actual vehicle height of a front portion of the vehicle body and an actual vehicle height of a rear portion of the vehicle body, and
    wherein the vehicle height adjust control apparatus further comprises:
    determination means associated with the control means, for determining whether the rear portion of the vehicle body is tilted by at least a predetermined amount downward relative to the front portion of the vehicle body, based on the actual vehicle heights detected by the vehicle height detection means; and
    stop means associated with the control means, for, when it is determined by the determination means that the rear portion of the vehicle body is tilted by at least the predetermined amount downward relative to the front portion of the vehicle body, stopping a control operation by the simultaneous control means of simultaneously changing the vehicle heights at the individual wheel positions.

4. A vehicle height adjust control apparatus according to claim 1, further comprising:
    a pump that ejects fluid when operated;
    fluid supply-discharge means for supplying the fluid ejected by the pump to the fluid actuators and discharging the fluid from the fluid actuators; and
    an accumulator that accumulates the fluid ejected by the pump,
    wherein the control means is linked to the actuators, the pump, the accumulator and the fluid supply-discharge means and the control means controls the pump and the fluid supply-discharge means, and
    wherein the simultaneous control means associated with the control means simultaneously increases the vehicle heights at the individual wheel positions if the actual vehicle heights detected by the vehicle height detection means are at least a predetermined value lower than the corresponding target vehicle heights by controlling the pump and the fluid supply-discharge means so that an amount of the fluid ejected by the pump and an amount of the fluid in the accumulator are simultaneously supplied to the actuators.

5. A vehicle height adjust control apparatus according to claim 4, further comprising:
    determination means associated with the vehicle height control means, for determining whether the vehicle body is tilted by at least a predetermined amount, on the basis of the actual vehicle heights detected by the vehicle height detection means; and stop means associated with the control means, for, when it is determined by the determination means that the vehicle body is tilted at least the predetermined amount, stopping a control operation by the simultaneous control means of simultaneously increasing the vehicle heights at the individual wheel positions.

6. A vehicle height adjust control apparatus according to claim 4, further comprising prevention means associated with the control means, for, when the accumulator is accumulating the fluid ejected by the pump, preventing a control operation by the simultaneous control means of simultaneously increasing the vehicle heights at the individual wheel positions.

7. A vehicle height adjust control apparatus according to claim 4, further comprising:

duration measurement means associated with the control means, for measuring a duration of a control operation by the simultaneous control means of simultaneously increasing the vehicle heights at the individual wheel positions; and stop means associated with the control means, for, when the duration detected by the duration measurement means becomes equal to or greater than a predetermined value, stopping the control operation by the simultaneous control means.

8. A method of controlling a vehicle height adjust apparatus for a vehicle that includes a plurality of actuators positioned between a vehicle body and a plurality of wheels capable of raising and lowering the vehicle body by fluid supplied to and discharged from the actuators, a vehicle height detector and a controller linked to the actuators and the vehicle height detector, the method comprising:

detecting an actual vehicle height at different positions;

controlling the actuators with the controller to eliminate deviations between the detected actual vehicle heights and corresponding target vehicle heights; and simultaneously changing the actual vehicle heights at individual wheel positions by controlling a fluid supply to the actuators from an accumulator if the actual vehicle heights are deviated from the corresponding target vehicle heights by at least a predetermined value toward the same side.

9. A method of controlling a vehicle height adjust apparatus according to claim 8, further comprising:

determining whether the vehicle body is tilted by at least a predetermined amount; and stopping the simultaneously changing step when the vehicle body is tilted by at least the predetermined amount.

10. A method of controlling a vehicle height adjust apparatus according to claim 8, wherein detecting includes detecting at least an actual vehicle height of a front portion of the vehicle body and an actual vehicle height of a rear portion of the vehicle body, the method further comprising:

determining whether the rear portion of the vehicle body is tilted by at least a predetermined amount downward relative to the front portion of the vehicle body based on the actual detected vehicle heights; and stopping the simultaneously changing step when the rear portion of the vehicle body is tilted by at least the predetermined amount downward relative to the front portion of the vehicle body.

11. A method of controlling a vehicle height adjust apparatus according to claim 8, wherein the apparatus includes a pump that ejects the fluid when operated, fluid supply-discharge elements that supply the fluid ejected by the pump to the actuators and discharge the fluid from the actuators, an accumulator that accumulates the fluid ejected by the pump and a controller that controls the actuators, the pump, the fluid supply-discharge elements and the accumulator, wherein simultaneously changing includes simultaneously increasing the vehicle heights at the different positions if the actual detected vehicle heights are at least a predetermined value lower than the corresponding target vehicle heights by controlling the pump and the fluid supply-discharge elements so that an amount of the fluid ejected by the pump and an amount of the fluid in the accumulator are simultaneously supplied to the actuators.

12. A method of controlling a vehicle height adjust apparatus according to claim 11, further comprising preventing the simultaneously changing step from occurring when the accumulator is accumulating the fluid ejected by the pump.

13. A method of controlling a vehicle height adjust apparatus according to claim 11, further comprising:

detecting a duration of the simultaneously changing step; and stopping the simultaneously changing step when the detected duration is at least as great as a predetermined value.

14. A vehicle height adjust control apparatus, comprising:

a plurality of actuators provided between a vehicle body and a plurality of wheels, respectively, the actuators being capable of changing a vehicle height at a wheel position corresponding to each of a plurality of wheels of the vehicle;

a vehicle height detector that detects an actual vehicle height at different positions;

a controller that controls the actuators to eliminate deviations of the actual vehicle heights detected by the vehicle height detector from corresponding predetermined target vehicle heights; and a simultaneous controller linked with the controller that simultaneously changes the vehicle heights at individual wheel positions by controlling a fluid supply to the actuators from an accumulator if the actual vehicle heights detected by the vehicle height detector are deviated from the corresponding target vehicle heights by at least a predetermined value toward the same side.

15. A vehicle height adjust control apparatus according to claim 14, further comprising:

a determination block linked with the controller that determines whether the body is tilted by at least a predetermined amount based on the actual detected vehicle heights; and a simultaneous controller stop block linked with the controller that stops operation of the simultaneous control block if the vehicle body is tilted by at least the predetermined amount.

16. A vehicle height adjust control apparatus according to claim 14, wherein the vehicle height detector detects at least an actual vehicle height of a front portion of the vehicle body and an actual vehicle height of a rear portion of the vehicle body, further comprising:

a determination block linked with the controller that determines whether the rear portion of the vehicle body is tilted by at least a predetermined amount downward relative to the front portion of the vehicle body based on the actual detected vehicle heights; and a simultaneous controller stop block linked with the controller that stops operation of the simultaneous controller when the vehicle body is tilted by at least the predetermined amount downward relative to the front portion of the vehicle body.

17. A vehicle height adjust control apparatus according to claim 15, further comprising a pump that ejects fluid when operated, fluid supply-discharge elements that supply the fluid ejected by the pump to the fluid actuators and discharge the fluid from the fluid actuators and an accumulator that accumulates the fluid ejected by the pump, wherein the controller is linked to the actuators, the pump, the accumulator and the fluid supply-discharge elements and the controller controls the pump and the fluid supply-discharge elements, and wherein the simultaneous controller simultaneously increases the vehicle heights at the individual positions if the actual detected vehicle heights are at least a predetermined value lower than the corresponding target vehicle heights by controlling the pump and the fluid supply-discharge elements so that an amount of the fluid ejected by the pump and an amount of the fluid in the accumulator are simultaneously supplied to the actuators.

18. A vehicle height adjust control apparatus according to claim 17, further comprising a prevention block linked with the controller that prevents operation of the simultaneous controller when the accumulator is accumulating the fluid ejected by the pump.

19. A vehicle height adjust control apparatus according to claim 17, further comprising:

a duration measurement block linked with the controller that measures a duration of a control operation by the simultaneous controller; and a simultaneous controller stop block that stops operation of the simultaneous controller when the detected duration is at least as great as a predetermined value.

* * * * *